(12) United States Patent
Park

(10) Patent No.: US 11,031,011 B2
(45) Date of Patent: Jun. 8, 2021

(54) ELECTRONIC DEVICE AND METHOD FOR DETERMINING ELECTRONIC DEVICE TO PERFORM SPEECH RECOGNITION

(71) Applicant: Samsung Electronics Co., Ltd., Suwon-si (KR)

(72) Inventor: Kyungmin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 198 days.

(21) Appl. No.: 16/525,041

(22) Filed: Jul. 29, 2019

(65) Prior Publication Data
US 2020/0043490 A1 Feb. 6, 2020

(30) Foreign Application Priority Data
Aug. 3, 2018 (KR) .................. 10-2018-0090882

(51) Int. Cl.
*G10L 15/22* (2006.01)
*G10L 15/08* (2006.01)

(52) U.S. Cl.
CPC .......... *G10L 15/22* (2013.01); *G08C 2201/93* (2013.01); *G10L 2015/088* (2013.01); *G10L 2015/223* (2013.01)

(58) Field of Classification Search
CPC .............. G10L 15/22; G10L 2015/088; G08C 2201/93
See application file for complete search history.

(56) References Cited

U.S. PATENT DOCUMENTS 8,355,713 B1 * 1/2013 Oh .................. G08C 17/02
455/420
2005/0283475 A1 * 12/2005 Beranek
(Continued)

FOREIGN PATENT DOCUMENTS

JP 2017-192091 A 10/2017
KR 10-2010-0066918 A 6/2010
(Continued)

OTHER PUBLICATIONS

International Search Report dated Dec. 2, 2019, issued in International Patent Application No. PCT/KR2019/009264.

*Primary Examiner* — Feng-Tzer Tzeng
(74) *Attorney, Agent, or Firm* — Jefferson IP Law, LLP

(57) ABSTRACT

Electronic devices and methods for controlling the electronic devices are provided. The electronic device includes a user interface, a communication circuit configured to connect to a cellular network and a Wi-Fi network, a microphone, a speaker, a processor connected to the user interface, the communication circuit, the microphone, and the speaker, and a memory connected to the processor and configured to store instructions executable by the processor for transmitting a first audio sound including first information associated with a wakeup utterance for calling a speech-based intelligence service through the speaker upon receipt of the wakeup utterance through the microphone, receiving a second audio sound including second information through the microphone, and determining whether to control the electronic device to transmit speech information following the wakeup utterance to an external server based on at least part of a comparison between the first information and the second information.

20 Claims, 14 Drawing Sheets

(56) References Cited

U.S. PATENT DOCUMENTS

2017/0345420 A1 11/2017 Barnett, Jr.
2018/0014160 A1 1/2018 Wootton et al.
2019/0180738 A1 6/2019 Kim

FOREIGN PATENT DOCUMENTS

KR 10-2015-0103586 A 9/2015
KR 10-2018-0023617 A 3/2018

* cited by examiner

ELECTRONIC DEVICE AND METHOD FOR DETERMINING ELECTRONIC DEVICE TO PERFORM SPEECH RECOGNITION

CROSS-REFERENCE TO RELATED APPLICATION(S)

This application is based on and claims priority under 35 U.S.C. § 119(a) of a Korean patent application number 10-2018-0090882, filed on Aug. 3, 2018, in the Korean Intellectual Property Office, the disclosure of which is incorporated by reference herein in its entirety.

BACKGROUND

1. Field

The disclosure relates to electronic devices and methods for determining an electronic device to perform speech recognition.

2. Description of Related Art

Various kinds of electronic devices have been introduced, and they include a smartphone, a tablet personal computer (PC), a portable multimedia player (PMP), a personal digital assistant (PDA), and a laptop PC.

Many kinds of electronic devices are designed to provide a speech-based intelligent assistance service that allows a user to execute various functions of the electronic devices using voice commands.

Meanwhile, commercialization of the Internet-of-things (IoT), which interconnects devices distributed in a user's living environment for sharing information, is creating a positive environment for making it possible to transfer an execution command to a remote electronic device connected to a network by means of a speech recognition-enabled electronic appliance such as a television and a refrigerator.

Typically, a speech recognition-enabled electronic device is provided with a microphone for receiving a speech signal and a speaker for outputting a speech recognition result.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide electronic devices for recognizing a user's speech. If a user's speech is recognized, the electronic devices may transmit corresponding voice information to an external server of a speech-based intelligent assistance service provider to process the speech recognition.

The external server may process the speech information transmitted by the electronic devices that have recognized the user's speech. However, redundant processing of the user's speech information may increase a speech recognition processing load of the external server.

A speech recognition processing overload of the external server may decrease a speech recognition processing speed, which may cause the user to transmit/receive redundant data unnecessarily.

Additional aspects will be set forth in part in the description which follows and, in part, will be apparent from the description, or may be learned by practice of the presented embodiments.

In accordance with an aspect of the disclosure, an electronic device is provided. The electronic device includes a user interface, at least one communication circuit configured to connect to a cellular network and a Wi-Fi network, a microphone, at least one speaker, at least one processor operationally connected to the user interface, the at least one communication circuit, the microphone, and the at least one speaker, and a memory operationally connected to the processor and configured to store instructions executable by the processor to cause the processor to transmit a first audio sound including first information associated with a wakeup utterance for calling a speech-based intelligence service through the speaker upon receipt of the wakeup utterance through the microphone, receive a second audio sound including second information through the microphone, and determine whether to control the electronic device to transmit speech information following the wakeup utterance to an external server based on at least part of a comparison between the first information and the second information.

In accordance with another aspect of the disclosure, an operational method of an electronic device is provided. The method includes receiving a wakeup utterance for calling a speech-based intelligent assistance service through a microphone of the electronic device, broadcasting, through a speaker of the electronic device, a first audio sound including first information associated with the wakeup utterance, receiving, through the microphone, a second audio sound including second information transmitted by an external electronic device, and determining whether to transmit speech information following the wakeup utterance to an external server based on at least part of a comparison between the first information and the second information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
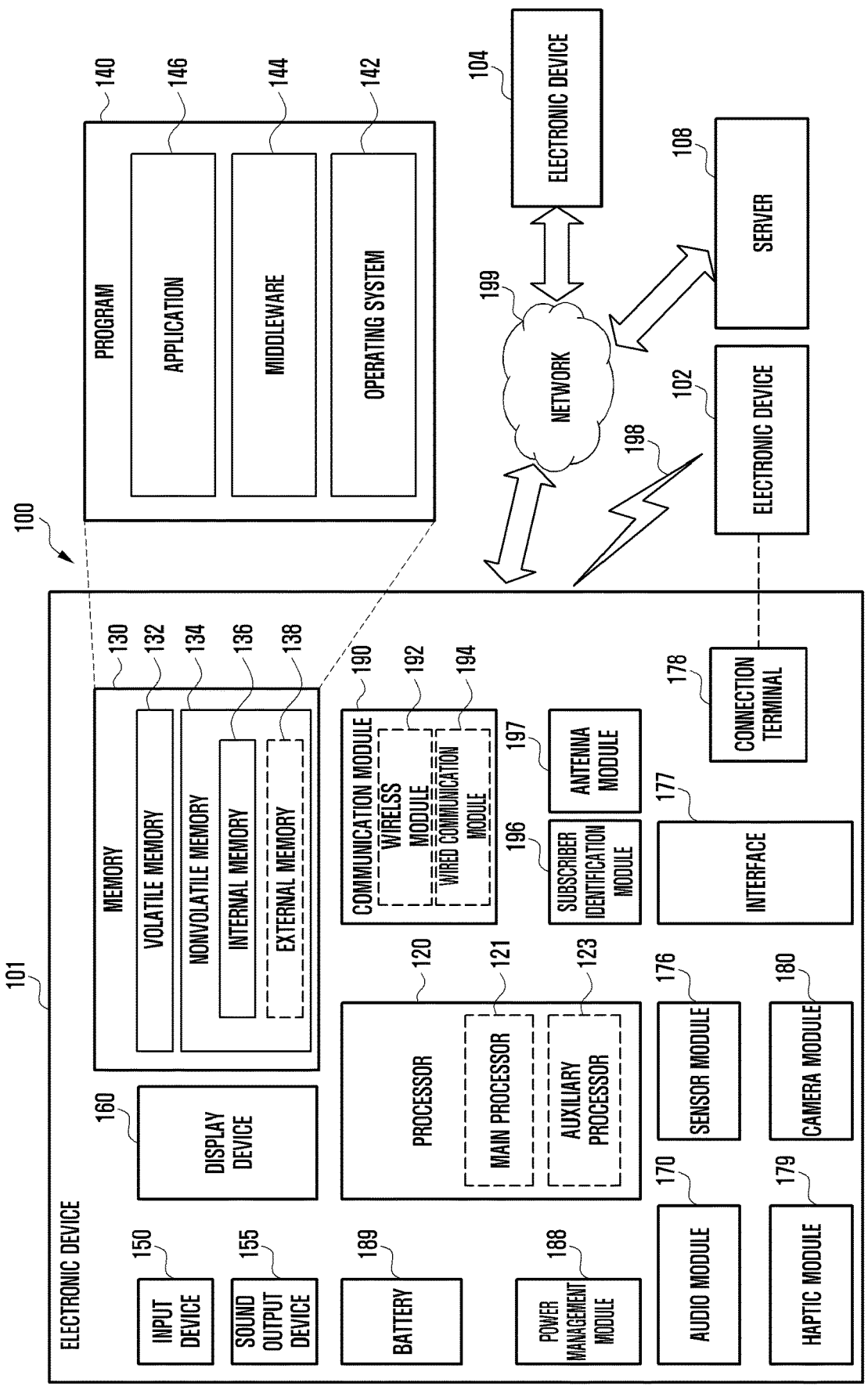
FIG. 1 is a block diagram illustrating a configuration of an electronic device according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or an external electronic device 104 or a server 108 via a second network 199 (e.g., a long-range wireless communication network). According to an embodiment, the electronic device 101 may communicate with the external electronic device 104 via the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the external electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of a same type as, or a different type, from the electronic device 101.

According to an embodiment, all or some of operations to be executed at the electronic device 101 may be executed at one or more of the external electronic devices 102 and 104 or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
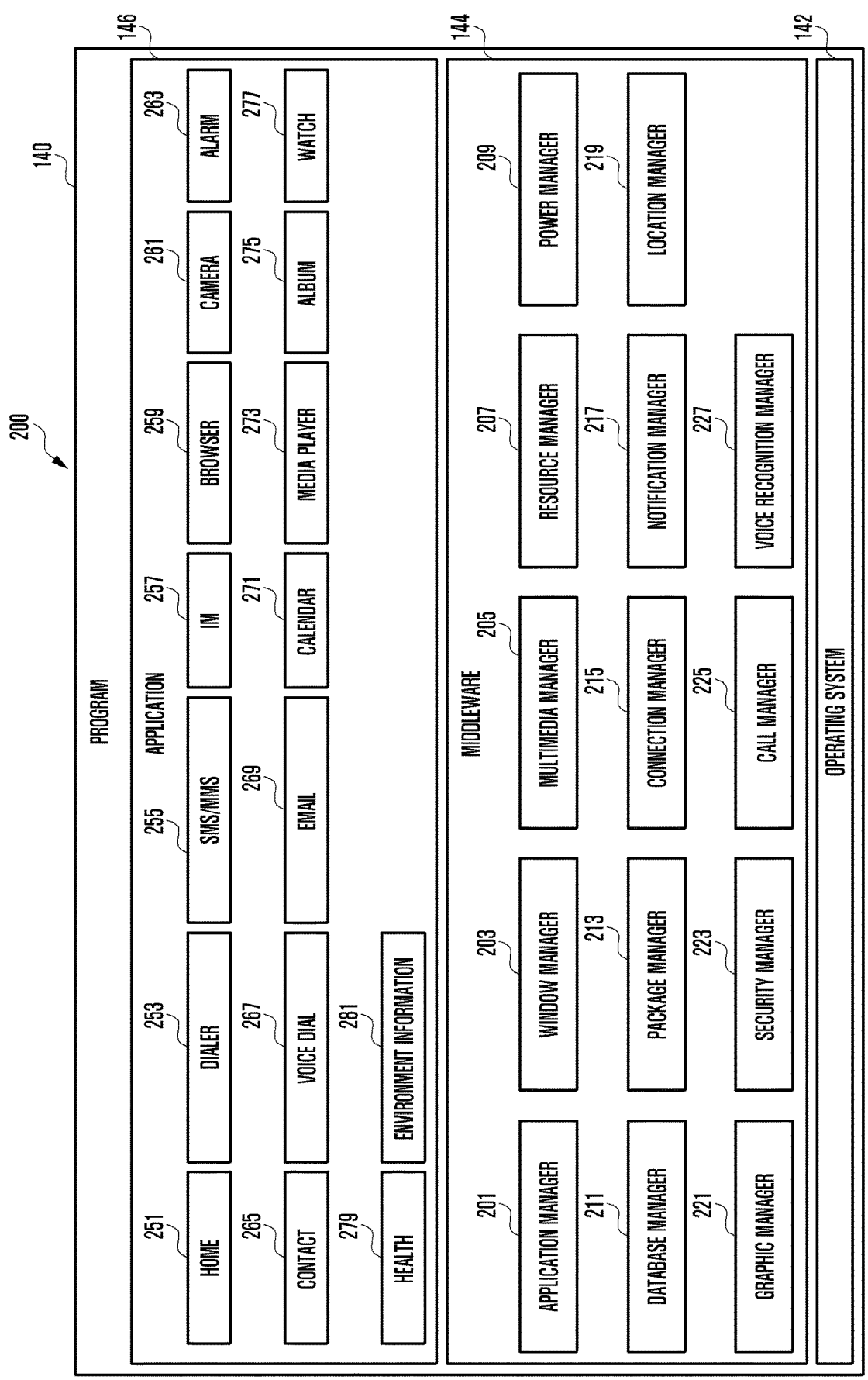
FIG. 2 is a block diagram illustrating programs according to an embodiment of the disclosure.

FIG. 2 is a block diagram illustrating a program according to an embodiment of the disclosure.

Referring to FIG. 2, block diagram 200 illustrates that the program 140 may include the OS 142 to control one or more resources of the electronic device 101, middleware 144, or the application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the external electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the SIM 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connection manager 215, a notification manager 217, a location manager 219, a graphic manager 221, a security manager 223, a call manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connection manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface (UI) related to the one or more graphic effects.

The security manager 223, for example, may provide system security or user authentication. The call manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice dial 267, email 269, calendar 271, media player 273, album 275, watch 277, health 279 (e.g., for measuring the degree of workout or biometric information, such as blood sugar), or environment information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3:
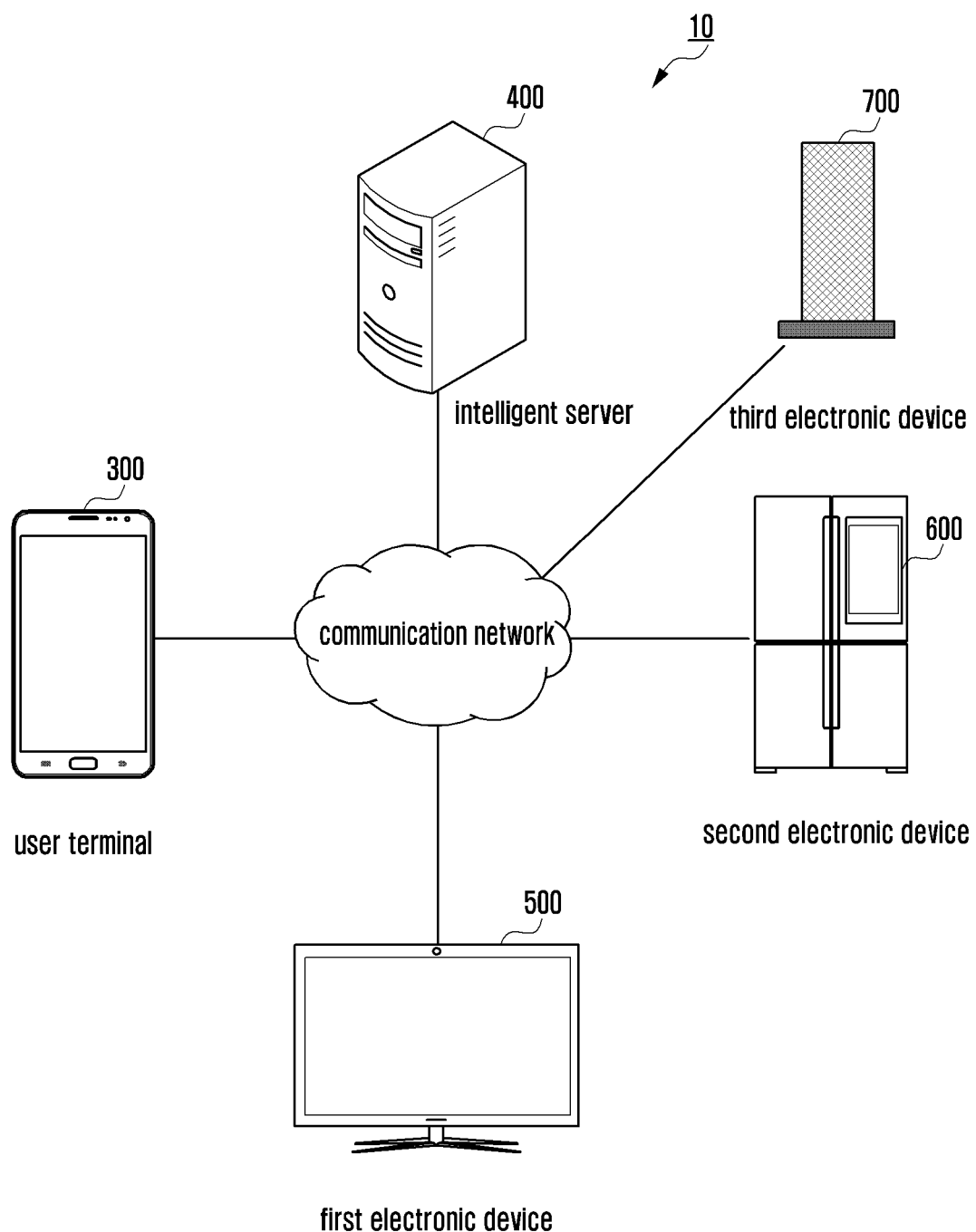
FIG. 3 is a diagram illustrating an integrated intelligence system according to an embodiment of the disclosure.

FIG. 3 is a diagram illustrating an integrated intelligence system including speech recognition-enabled electronic devices and a server according to an embodiment of the disclosure.

Referring to FIG. 3, an integrated intelligence system 10 may include a user terminal 300 (e.g., the electronic device 101 in FIG. 1), an intelligent server 400 (e.g., the server 108 in FIG. 1), a first electronic device 500, a second electronic device 600, and a third electronic device 700.

According to various embodiments of the disclosure, the user terminal 300, the first electronic device 500, the second electronic device 600, and the third electronic device 700 have apps (or application programs) (e.g., an alarm app, a messaging app, a photo (gallery) app) stored therein for providing a user with required services. For example, the user terminal 300 may execute and run an app via a speech-based intelligent assistance service (or speech recognition app) stored therein. The user terminal 300 may receiver a user input for executing another application to perform an operation via the speech-based intelligent assistance service. The user input may be made by means of a physical button or a touchpad or may be a speech input or a remote input by way of example. According to an embodiment, the user terminal 300, the first electronic device 500, the second electronic derive 600, and the third electronic device 700 are each a mobile phone, a smartphone, a personal digital assistant (PDA), a laptop personal computer (PC), or an Internet-of-things (IoT) technology-enabled electronic device (e.g., smart television (TV), smart refrigerator, and a smart air purifier) that is able to connect to the Internet.

According to various embodiments, the user terminal 300, the first electronic device 500, the second electronic device 600, and the third electronic device 700 may receive a user's utterance as a user input. The user terminal 300, the first electronic device 500, the second electronic device 600, and the third electronic device 700 may receive the user's utterance and generate a command for executing an app based on the user's utterance. As a consequence, the user terminal 300, the first electronic device 500, the second electronic device 600, and the third electronic device 700 may execute the app according to the command.

According to various embodiments of the disclosure, the user terminal 300, the first electronic device 500, the second electronic device 600, and the third electronic device 700 may receive a user's utterance and generate speech data corresponding to the user's utterance. The generated speech data may be transmitted to the intelligent server 400. The user terminal 300, the first electronic device 500, the second electronic device 600, and the third electronic device 700 may transmit the generated speech data to the intelligent server 400 via a cellular network or a short range communication network (e.g., Wi-Fi and LAN).

According to various embodiments of the disclosure, the user terminal 300 may transmit/receive data to/from the intelligent server 400 via a first network. The first electronic device 500, the second electronic device 600, and the third electronic device 700 may transmit/receive data to/from the intelligent server 400 via a second network that differs in communication mode from the first network. The first network may include a cellular network (e.g., 3rd generation (3G) network, long-term evolution (LTE) network, and 5th generation (5G) network). The second network may include a short range communication network (e.g., Wi-Fi, Zigbee, and LAN). The first network may also include a short range communication network, and the second network may also include a cellular network.

According to various embodiments of the disclosure, the user terminal 300, the first electronic device 500, the second electronic device 600, and the third electronic device 700 may pre-process the speech data before the speech data is transmitted to the intelligent server 400. For example, the user terminal 300, the first electronic device 500, the second electronic device 600, and the third electronic device 700 may pre-process the speech data in various manners such as removing an echo from the speech data, removing a background noise from the speech data, and adjusting a size of the speech contained in the speech data and transmit the pre-processed speech data to the intelligent server 400.

According to various embodiments of the disclosure, the intelligent server 400 may receive the speech data corresponding to the user's utterance from an external device (e.g., the user terminal 300, the first electronic device 500, the second device 600, and the third electronic device 700) via a communication network and convert the speech data to text data.

According to various embodiments of the disclosure, the intelligent server 400 may transmit the text data to the user terminal 300. The user terminal 300 may output the received text data using a display or a speaker.

According to various embodiments of the disclosure, the intelligent server 400 may convert the speech data to the text data using an acoustic model and a language module stored in a memory of the intelligent server 400. The acoustic module may be a database mapping and storing feature vectors acquired by processing the speech data and groups of candidate phonemes corresponding to the feature vectors. The language module may be a database storing information being used for modeling a linguistic ordering relationship such as words and syllables using the phonemes corresponding to the extracted speech data. In the language model, the speech data and words including the phonemes belonging to the groups of the candidate phonemes may be mapped and stored. In the language model, matching probabilities between the words including the phonemes belonging to the groups of the candidate phonemes and the speech data may be stored along with respective mappings. The intelligence server 400 may select a word corresponding to the speech data based on the matching probabilities between the words including the phonemes belonging to the groups of the candidate phonemes and the speech data.

According to various embodiments of the disclosure, the intelligent server 400 may perform a natural language understanding (NLU) process using the text data generated by converting the speech data. The NLU process may mean an operation of determining an utterance intent of user's speech based on the converted text data. The intelligent server 400 may determine the user's intent through a syntactic analysis or a semantic analysis. The syntactic analysis may be performed in such a way of segmenting a user input into syntactic units (e.g., words, phrases, and morphemes) and grasping which syntactic elements are included in the segmented syntactic units. The semantic analysis may be performed using a semantic matching, a rule matching, or a formula matching. A cloud server 330 may determine the user's intent and parameters using a domain for identifying a service matching an intent corresponding to a user input and a matching rule consisting of intents and parameters (or slots) necessary for checking for the intents. For example, a domain (e.g., alarm) may include a plurality of intents (e.g., alarm setting and alarm release), and an intent may include a plurality of parameters (e.g., time, number of repetitions, and alarm sound).

According to various embodiments of the disclosure, the intelligent server 400 may check for the meaning of a word extracted from the user input based on linguistic features (e.g., grammatical elements) such as morphemes and phrases and match the meaning of the extracted word with a domain and an intent to determine the user's intent. For example, the intelligent server 400 may determine the user's intent by reckoning how many words extracted from the user input are included in each of the domain and the intent. According to an embodiment, the intelligent server 400 may determine parameters of the user input using the words as the basis of identifying the intent. According to an embodiment, the intelligent server 400 may determine the user's intent based on a natural language recognition database (not shown) storing linguistic features for use in measuring the intent of the user input. According to an alternative embodiment, the intelligent server 400 may determine a user's intent using a personalized language module (PLM). For example, the intelligent server 400 may determine a user's intent using personalized information (e.g., contact list and music playlist).

According to various embodiments of the disclosure, the intelligent server 400 may verify the user's intent determined through the NLU process and an operation appropriate for the user's intent and ascertain information on the parameters required for executing the operation corresponding to the user's intent. If parameters necessary for executing the operation corresponding to the user's intent are insufficient, the intelligent server 400 may request for parameters to the user terminal 300, the first electronic device 500, the second electronic device 600, and the third electronic device 700. If parameters necessary for executing the operation corresponding to the user's intent are sufficient, the intelligent server 400 may execute the operation corresponding to the user's intent and transmit an execution result to the user terminal 300, the first electronic device 500, the second electronic device 600, and the third electronic device 700.

Figure 4:
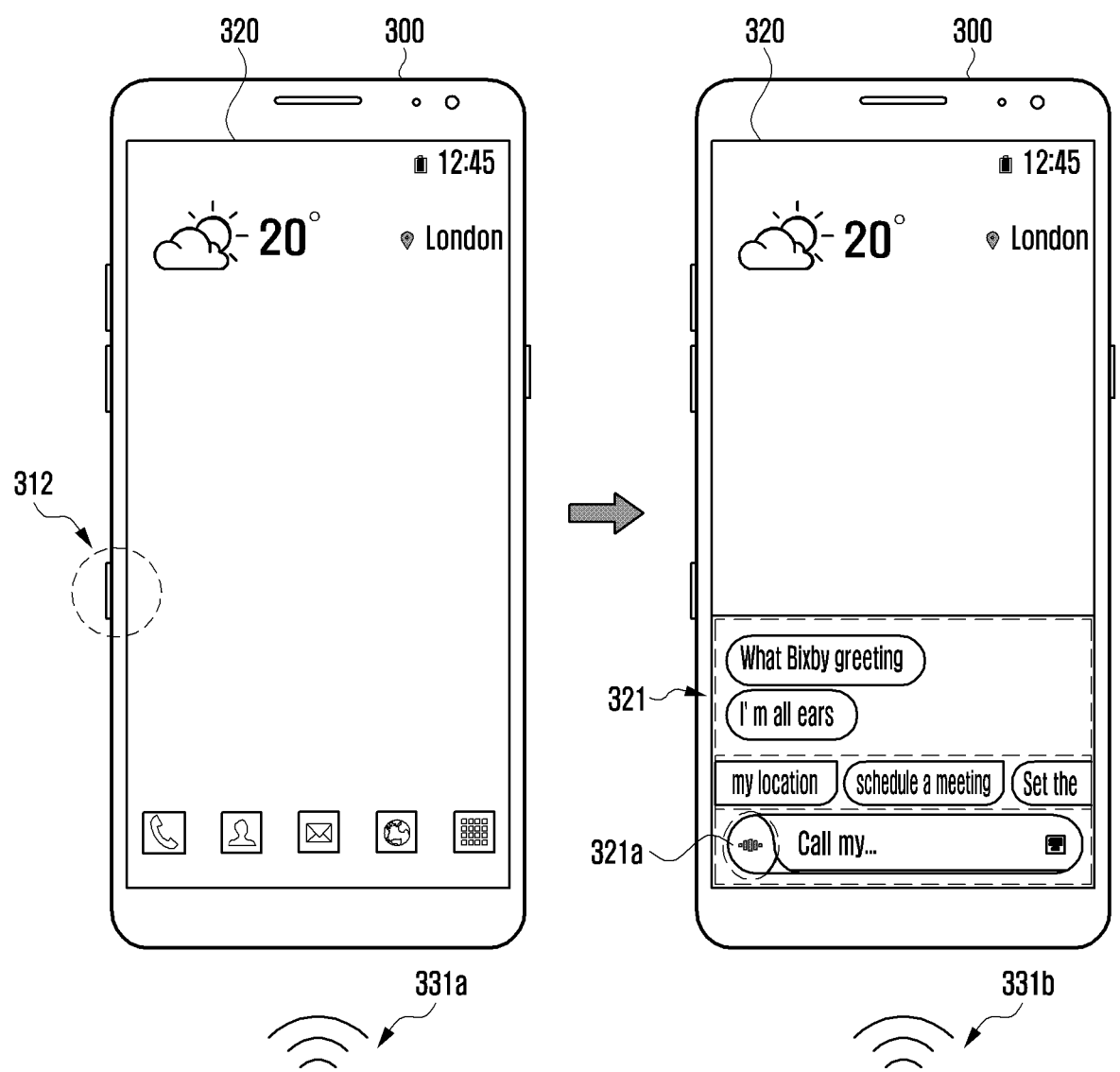
FIG. 4 is a diagram illustrating screen displays for explaining execution of a speech-based intelligent assistance service of a user terminal according to an embodiment of the disclosure.

FIG. 4 is a diagram illustrating screen displays for explaining execution of a speech-based intelligent assistance service of a user terminal according to an embodiment of the disclosure.

FIG. 4 depicts the user terminal 300 executing the speech-based intelligent assistance service in response to a user input.

Referring to FIG. 4, according to various embodiments of the disclosure, the speech-based intelligence service may mean a service for enabling various services based on an input (e.g., speech input on a microphone and touch or gesture input on a display 320 of the user terminal) made by a user of the user terminal 300.

According to various embodiments of the disclosure, the user terminal 300 may execute the speech-based intelligent assistance service for speech recognition in response to an input made by means of a hardware key 312. For example, upon receipt of a user input made by means of the hardware key 312, the user terminal 300 may display a UI on the display 320 for the speech-based intelligent assistance service. By way of example, the user may touch a speech recognition button 321a appearing in a UI 321 of the speech-based intelligent assistance service in order to make a user input in the state where the UI 321 of the speech-based intelligent assistance service is displayed on the display 320.

By way of another example, the user may also keep pressing the hardware key 312 to make a speech input as denoted by reference number 331b.

According to various embodiments, the user terminal 300 may receive a wakeup utterance for executing the speech-based intelligent assistance service that is made through a microphone (e.g., the input device 150 in FIG. 1). For example, if a predetermined speech (e.g., "Hey Galaxy!", "Bixby!", "Hi, Bixby!", and "Wake up!") is input through the microphone as denoted by reference number 331a, the user terminal 300 may display the UI 321 of the speech-based intelligent assistance service on the display 320.

According to various embodiments, various electronic devices may receive a wakeup utterance made by the user. For example, at least one of the user terminal 300, the first electronic device 500, the second electronic device 600, and the third electronic device 700 may receive the wakeup utterance made by the user. The at least one device that has received the wakeup utterance of the user may execute an operation for activating the speech-based intelligent assistance service. The at least one device that has received the wakeup utterance of the user may receive a user input associated with the speech-based intelligent assistance service (e.g., user input for executing a specific application or user input for controlling a registered electronic device) and transmit speech information obtained by converting the user input to a text to the intelligent server 400. The intelligent server 400 may determine an intent of the user or an operation corresponding to the user's intent based on the speech information transmitted by the at least one electronic device that had received the wakeup utterance. The intelligent server 400 may transmit a control signal for executing an operation corresponding to the user's intent to the at least one electronic device.

According to various embodiments of the disclosure, if more than one electronic device has received the wakeup utterance, it may be necessary for the intelligent server 400 to process the speech information transmitted by multiple electronic devices. If the intelligent server 400 processes all the speech information transmitted by the multiple electronic devices, it may increase the load on the intelligent server 400 and the time for processing the speech information. In order to reduce the load on the intelligent server, it may be necessary to determine an electronic device responsible for transmitting speech information to the intelligent server among the electronic devices that received the wakeup utterance such that the determined electronic device transmits the speech information to the intelligent server 400 while other electronic devices do not transmit the speech information. Hereinafter, a description is made of the method for determining an electronic device responsible for transmitting the speech information being received after a wakeup utterance.

Figure 5:
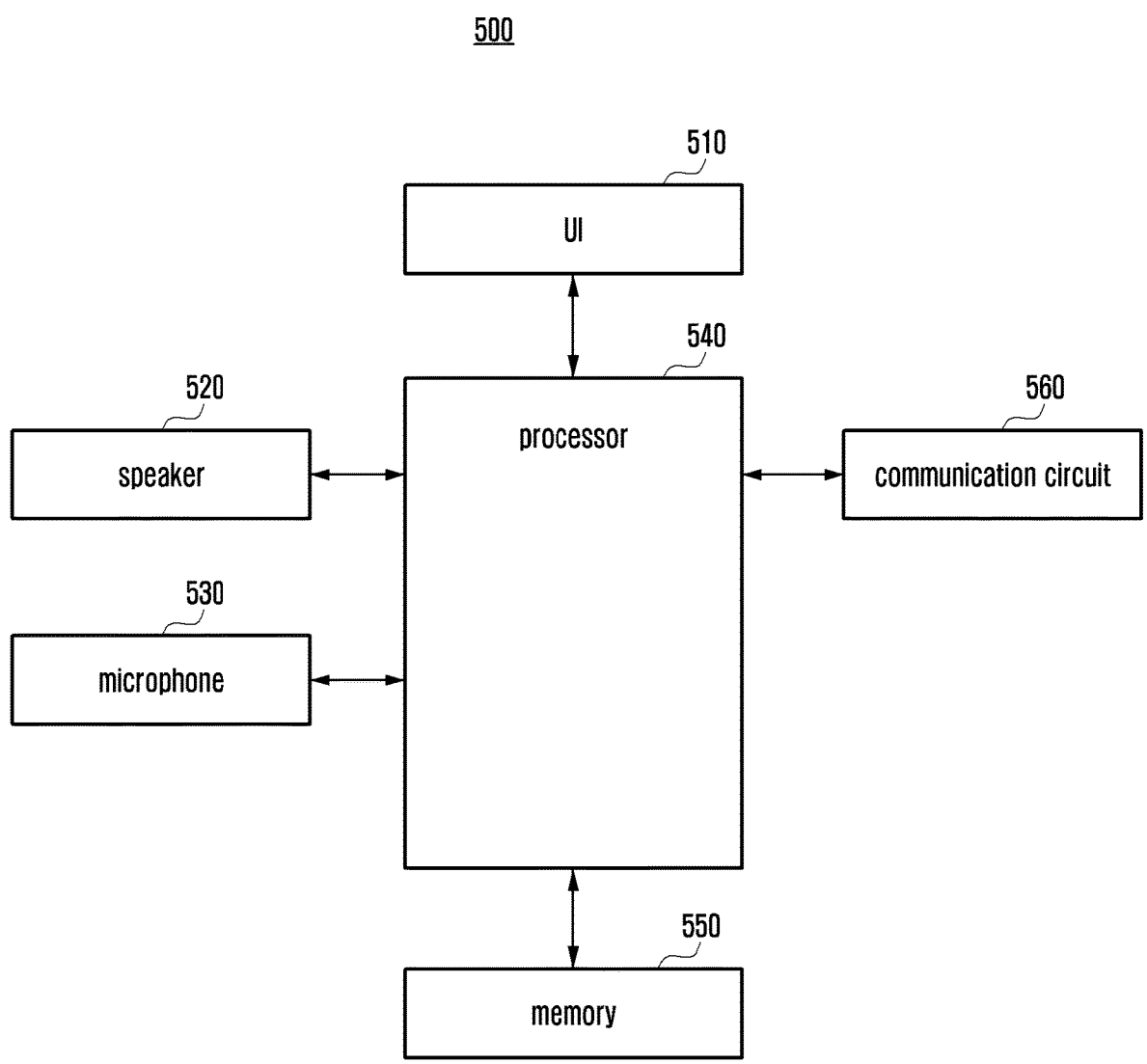
FIG. 5 is a block diagram illustrating a configuration of a first electronic device according to an embodiment of the disclosure.

FIG. 5 is a block diagram illustrating a configuration of a first electronic device according to an embodiment of the disclosure.

Referring to FIG. 5, the first electronic device 500 (e.g., the electronic device 101 in FIG. 1) may include a user interface (UI) 510 (e.g., the interface 177 in FIG. 1), a speaker 520 (e.g., the sound output device 155 in FIG. 1), a microphone 530 (e.g., the input device 150 in FIG. 1), a processor 540 (e.g., the processor 120 in FIG. 1), a memory 550 (e.g., the memory 130 in FIG. 1), and a communication circuit 560 (e.g., the communication module 190 in FIG. 1).

According to various embodiments of the disclosure, the UI 510 may mean a medium for the first electronic device 500 to receive an input made by a user or output information to the user.

According to various embodiments of the disclosure, the speaker 520 may output various audio sounds under the control of the processor 540.

According to various embodiments of the disclosure, the microphone 530 may pick up audio sounds around the first electronic device 500. The microphone 530 may receive a speech input of the user. For example, the microphone 530 may receive a wakeup utterance of the user for calling the speech-based intelligent assistance service and send speech information corresponding to the wakeup utterance to the processor 540.

According to various embodiments of the disclosure, the communication circuit 560 may be configured to connect to a cellular network (e.g., 3G network, LTE network, 5G network, WiBro network, and WiMax network) or a short range wireline/wireless communication network (e.g., Wi-Fi network, Zigbee network, and LAN). According to various embodiments of the disclosure, the communication circuit 560 may transmit/receive various data to/from the intelligent server (e.g., the intelligent server 400 in FIG. 3) under the control of the processor 540.

According to various embodiments of the disclosure, the processor 540 may receive a wakeup utterance for calling the speech-based intelligent assistance service through the microphone 530. Upon receipt of the wakeup utterance, the processor 540 may control the communication circuit 560 to broadcast first information associated with the wakeup utterance.

According to various embodiments of the disclosure, the first information may include at least part of a wakeup utterance reception time at the first electronic device 500, a signal-to-noise ratio (SNR) of the wakeup utterance at the first electronic device 500, a quality of the wakeup utterance at the first electronic device 500, a priority of the first electronic device 500, and information on the first electronic device 500.

According to various embodiments of the disclosure, the quality of the wakeup utterance may mean a clarity degree of the wakeup utterance. The quality of the wakeup utterance may include the SNR of the wakeup utterance. The SNR of the wakeup utterance may mean a ratio of a size of the noise to a size of the wakeup utterance. The priority of the first electronic device 500 may mean a priority of the electronic device for processing a user input following the wakeup utterance among the electronic devices received the wakeup utterance. The information on the first electronic device 500 may be various kinds of information such as identity information (e.g., international mobile equipment identity (IMEI) and medium access control (MAC) address), a kind of the first electronic device (e.g., refrigerator and speaker), and information indicating whether the first electronic device 500 includes a specific component (e.g., display) capable of outputting data.

According to various embodiments of the disclosure, the processor 540 may generate the first information associated with the wakeup utterance received through the microphone 530.

According to various embodiments of the disclosure, the processor 540 may broadcast the first information in various manners. The processor 540 may broadcast the first information for other electronic devices connected to a network (e.g., Wi-Fi network) to which the first electronic device 500 is connected by means of the communication circuit 560.

According to various embodiments of the disclosure, at least one electronic device (e.g., the second electronic device 600) located around the first electronic device 500 may receive the first information broadcast by the first electronic device 500. The second electronic device 600 may also receive the wakeup utterance of the user. The second electronic device 600 may broadcast second information associated with the wakeup utterance upon receipt of the wakeup utterance.

According to various embodiments of the disclosure, the second information may include a wakeup utterance reception time at the second electronic device 600, an SNR of the wakeup utterance at the second electronic device 600, a quality of the wakeup utterance at the second electronic device 600, a priority of the second electronic device 600, and information on the second electronic device 600.

According to various embodiments of the disclosure, the SNR of the wakeup utterance may mean a ratio of a size of the noise to a size of the wakeup utterance. The quality of the wakeup utterance may mean a clarity degree of the wakeup utterance. The priority of the second electronic device 600 may mean a priority of the electronic device for processing a user input following the wakeup utterance among the electronic devices received the wakeup utterance. The information on the second electronic device 600 may be various kinds of information such as identity information (e.g., IMEI and MAC address) of the second electronic device 600, a kind of the second electronic device 600 (e.g., refrigerator and speaker), and information indicating whether the second electronic device 600 includes a specific component (e.g., display) capable of outputting data.

According to various embodiments of the disclosure, the processor 540 may receive the second information transmitted by the second electronic device 600. The processor 540 may receive the second information in various manners. For example, the processor 540 may receive the second information by means of the communication circuit 560.

According to various embodiments of the disclosure, the first information and the second information may be broadcast in the same communication mode.

According to various embodiments of the disclosure, the processor 540 may compare the first information and the second information to determine whether to transmit the speech information being received after the wakeup utterance to the intelligent server 400 based on at least part of a comparison result.

According to various embodiments of the disclosure, the processor 540 may compare the SNR of the wakeup utterance that is measured at the first electronic device 500 and the signal-to-interference-plus-noise ratio (SINR) of the wakeup utterance that is included in the second information. If the SNR of the wakeup utterance that is measured at the first electronic device 500 is greater than the SINR of the wakeup utterance that is included in the second information, this may indicate that the first electronic device 500 has an environment superior to that of the second electronic device 600 for receiving a user's speech following the wakeup utterance. The processor 540 may determine to transmit the user's speech following the wakeup utterance to the intelligent server 400 based on a determination that the SNR of the wakeup utterance that is measured at the first electronic device 500 is greater than the SINR of the wakeup utterance that is included in the second information. The processor 540 may determine not to transmit the user's speech following the wakeup utterance to the intelligent server 400 based on a determination that the SNR of the wakeup utterance that is included in the first information is less than the SNR of the wakeup utterance that is included in the second information. In this case, the second electronic device 600 may determine to transmit the user's speech following the wakeup utterance to the intelligent server 400.

According to various embodiments of the disclosure, the processor 540 may compare the quality of the wakeup utterance that is included in the first information and the quality of the wakeup utterance that is included in the second information. If the quality of the wakeup utterance that is included in the first information is better than the quality of the wakeup utterance that is included in the second information, this may indicate that the first electronic device 500 has an environment superior to that of the second electronic device 600 for receiving the user's speech following the wakeup utterance. The processor 540 may determine to transmit the user's speech following the wakeup utterance to the intelligent server 400 based on a determination that the quality of the wakeup utterance that is included in the first information is better than the quality of the wakeup utterance that is included in the second information. The processor 540 may determine not to transmit the user's speech following the wakeup utterance to the intelligent server 400 based on a determination that the quality of the wakeup utterance that is included in the first information is worse than the quality of the wakeup utterance that is included in the second information. In this case, the second electronic device 600 may determine to transmit the user's speech following the wakeup utterance to the intelligent server 400.

According to various embodiments of the disclosure, the processor 540 may compare the priority of the first electronic device 500 that is included in the first information and the priority of the second electronic device 600 that is included in the second information. The priority may mean a priority for determining the electronic device to process the user's speech preferentially. The processor 540 may determine to transmit the user's speech following the wakeup utterance to the intelligent server 400 based on a determination that the priority of the first electronic device 500 is higher than that of the second electronic device 600.

According to various embodiments of the disclosure, the processor 540 may check the SNR included in the second information received from the second electronic device 600 and compare the SNR included in the second information with the SNR measured at the first electronic device 500. The processor 540 may determine whether to broadcast the first information based on a result of the comparison between the SNR measured at the first electronic device 500 and the SNR included in the second information. The processor 540 may determine to broadcast the first information based on a determination that the SNR measured at the first electronic device 500 is greater than the SNR included in the second information. The processor 540 may determine not to broadcast the first information based on a determination that the SNR measured at the first electronic device 500 is less than the SNR included in the second information.

According to various embodiments of the disclosure, the processor 540 may determine to transmit the speech information being received after the wakeup utterance to the intelligent server 400 based on a determination that no second information is received in a predetermined time after broadcasting the first information related to a wakeup.

According to various embodiments of the disclosure, the second electronic device (e.g., the second electronic device 600 in FIG. 3) and the third electronic device (e.g., the third electronic device 700 in FIG. 3) may each include components identical in functionality with the components (e.g., the UI 510, the speaker 520, the microphone 530, the processor 540, the memory 550, and the communication circuit 560) of the first electronic device 500.

According to various embodiments of the disclosure, the memory 550 may store instructions associated with the above-described operations of the processor 540.

Figure 6:
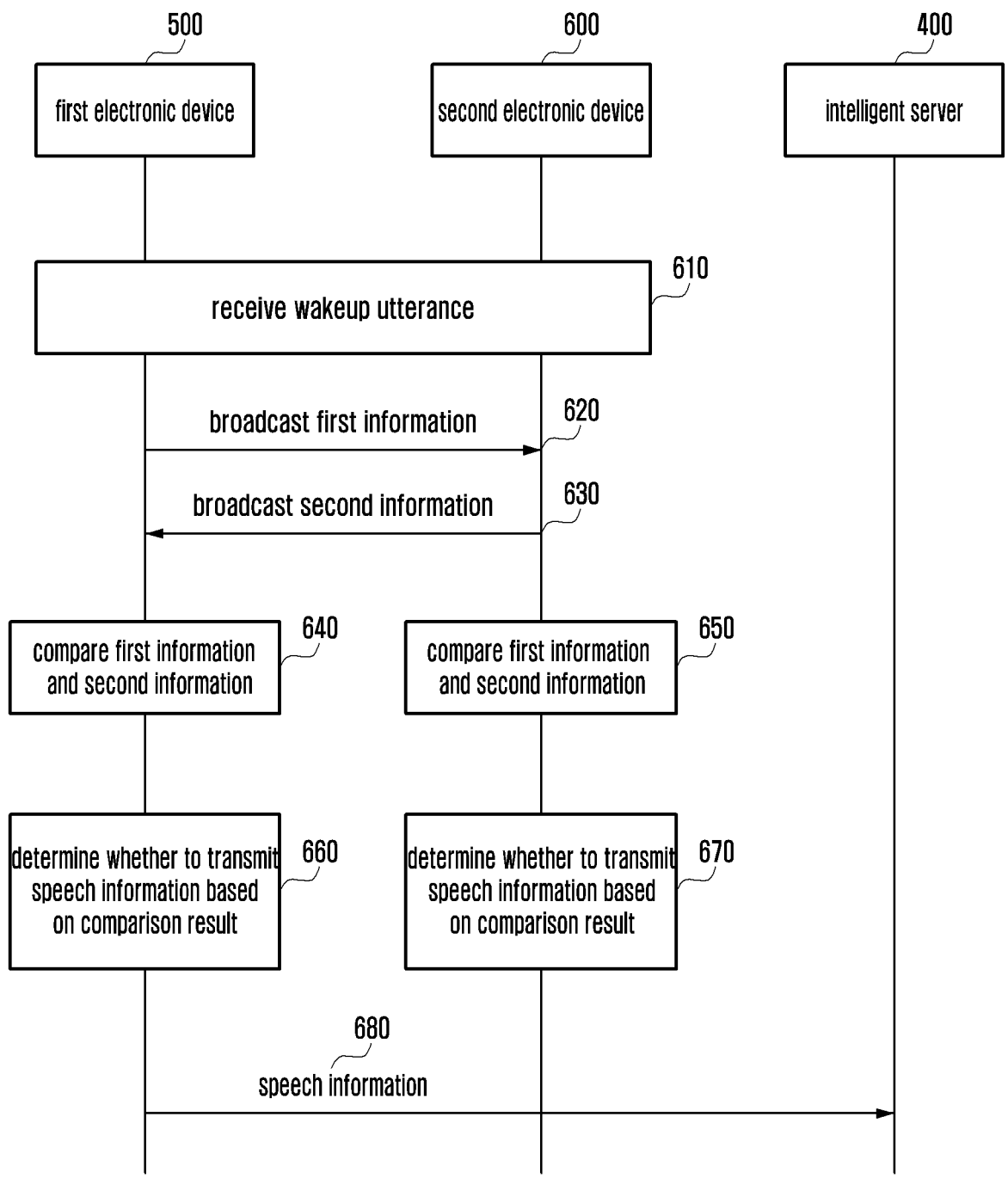
FIG. 6 is a signal flow diagram illustrating signal flows between a first electronic device and a second electronic device according to an embodiment of the disclosure.

FIG. 6 is a signal flow diagram illustrating signal flows between a first electronic device and a second electronic device according to an embodiment of the disclosure.

Referring to FIG. 6, according to various embodiments of the disclosure, the first electronic device (e.g., the first electronic device 500 in FIG. 3) and the second electronic device (e.g., the second device 600 in FIG. 3) may receive a wakeup utterance of a user at operation 610. If the first and second electronic devices 500 and 600 are located close to each other, both the first and second electronic devices 500 and 600 may receive the wakeup utterance of the user.

According to various embodiments of the disclosure, the first electronic device 500 may broadcast, at operation 620, a first information associated with the wakeup utterance.

According to various embodiments of the disclosure, the first information may include at least part of a wakeup utterance reception time at the first electronic device 500, an SNR of the wakeup utterance at the first electronic device 500, a quality of the wakeup utterance at the first electronic device 500, a priority of the first electronic device 500, and information on the first electronic device 500.

According to various embodiments of the disclosure, the second electronic device 600 may broadcast, at operation 630, second information associated with the wakeup utterance.

According to various embodiments of the disclosure, the second information may include at least part of a wakeup utterance reception time at the second electronic device 600, an SNR of the wakeup utterance at the second electronic device 600, a quality of the wakeup utterance at the second electronic device 600, a priority of the second electronic device 600, and information on the second electronic device 600.

According to various embodiments of the disclosure, the SNR of the wakeup utterance may mean a ratio of a size of the noise to a size of the wakeup utterance. The quality of the wakeup utterance may mean a clarity degree of the wakeup utterance. The priority of the second electronic device 600 may mean a priority of the electronic device for processing a user input following the wakeup utterance among the electronic devices received the wakeup utterance. The information on the first electronic device 500 or the second electronic device 600 may be various kinds of information such as identity information (e.g., IMEI and MAC address) of the first electronic device 500 or the second electronic device 600, a kind of the first electronic device 500 or the second electronic device 600 (e.g., refrigerator and speaker), and information indicating whether the first electronic device 500 or the second electronic device 600 includes a specific component (e.g., a display) capable of outputting data.

According to various embodiments of the disclosure, the first information broadcast at operation 620 and the second information broadcast at operation 630 may be transmitted in the same communication scheme. For example, the first and second information may be broadcast in a short range communication mode (e.g., Wi-Fi, Bluetooth™, and Zigbee).

According to various embodiments of the disclosure, the first electronic device 500 may compare the first information and the received second information at operation 640. At operation 650, the second electronic device may compare the received first information and the second information.

According to various embodiments of the disclosure, the first and second electronic devices 500 and 600 may determine at respective at operations 660 and 670 whether to transmit the user's speech information following the wakeup utterance to the intelligent server based on the comparison results.

According to various embodiments of the disclosure, the first electronic device 500 may compare the SNR of the wakeup utterance that is included in the first information and the SNR of the wakeup utterance that is included in the second information. If the SNR of the wakeup utterance that is included in the first information is greater than the SINR of the wakeup utterance that is included in the second information, this may indicate that the first electronic device 500 has an environment superior to that of the second electronic device 600 for receiving the user's speech following the wakeup utterance. The first electronic device 500 may determine to transmit the user's speech following the wakeup utterance to the intelligent server 400 based on determining that the SNR of the wakeup utterance that is measured at the first electronic device 500 is greater than the SINR of the wakeup utterance that is included in the second information. The first electronic device 500 may determine not to transmit the user's speech following the wakeup utterance to the intelligent server 400 based on determining that the SNR of the wakeup utterance that is included in the first information is less than the SNR of the wakeup utterance that is included in the second information. In this case, the second electronic device 600 may determine to transmit the user's speech following the wakeup utterance to the intelligent server 400.

According to various embodiments of the disclosure, the first and second electronic devices 500 and 600 may each compare the quality of the wakeup utterance that is included in the first information and the quality of the wakeup utterance that is included in the second information. If the quality of the wakeup utterance that is included in the first information is better than the quality of the wakeup utterance that is included in the second information, this may indicate that the first electronic device 500 has an environment superior to that of the second electronic device 600 for receiving the user's speech following the wakeup utterance. The first electronic device 500 may determine to transmit the user's speech following the wakeup utterance to the intelligent server 400 based on a determination that the quality of the wakeup utterance that is included in the first information is better than the quality of the wakeup utterance that is included in the second information. In this case, the second electronic device 600 may determine not to transmit the user's speech following the wakeup utterance to the intelligent server 400.

According to various embodiments of the disclosure, the first electronic device 500 may determine not to transmit the user's speech following the wakeup utterance to the intelligent server 400 based on a determination that the quality of the wakeup utterance that is included in the first information is worse than the quality of the wakeup utterance that is included in the second information. In this case, the second electronic device 600 may determine to transmit the user's speech following the wakeup utterance to the intelligent server 400.

According to various embodiments of the disclosure, the first electronic device 500 may compare the priority of the first electronic device 500 that is included in the first information and the priority of the second electronic device 600 that is included in the second information. The priority may mean a priority for determining the electronic device to process the user's speech preferentially. The first electronic device 500 may determine to transmit the user's speech following the wakeup utterance to the intelligent server 400 based on a determination that the priority of the first electronic device 500 is higher than that of the second electronic device 600.

According to various embodiments of the disclosure, after making the decision to transmit speech information, the electronic device (e.g., the first electronic device 500) may transmit, at operation 680, the user's speech information following the wakeup utterance to the intelligent server 400.

Although FIG. 6 depicts that the first electronic device transmits speech information to the intelligent server 400, it may be possible for the second electronic device 600 to transmit the speech information to the intelligent server 400 depending on the comparison result.

Figure 7:
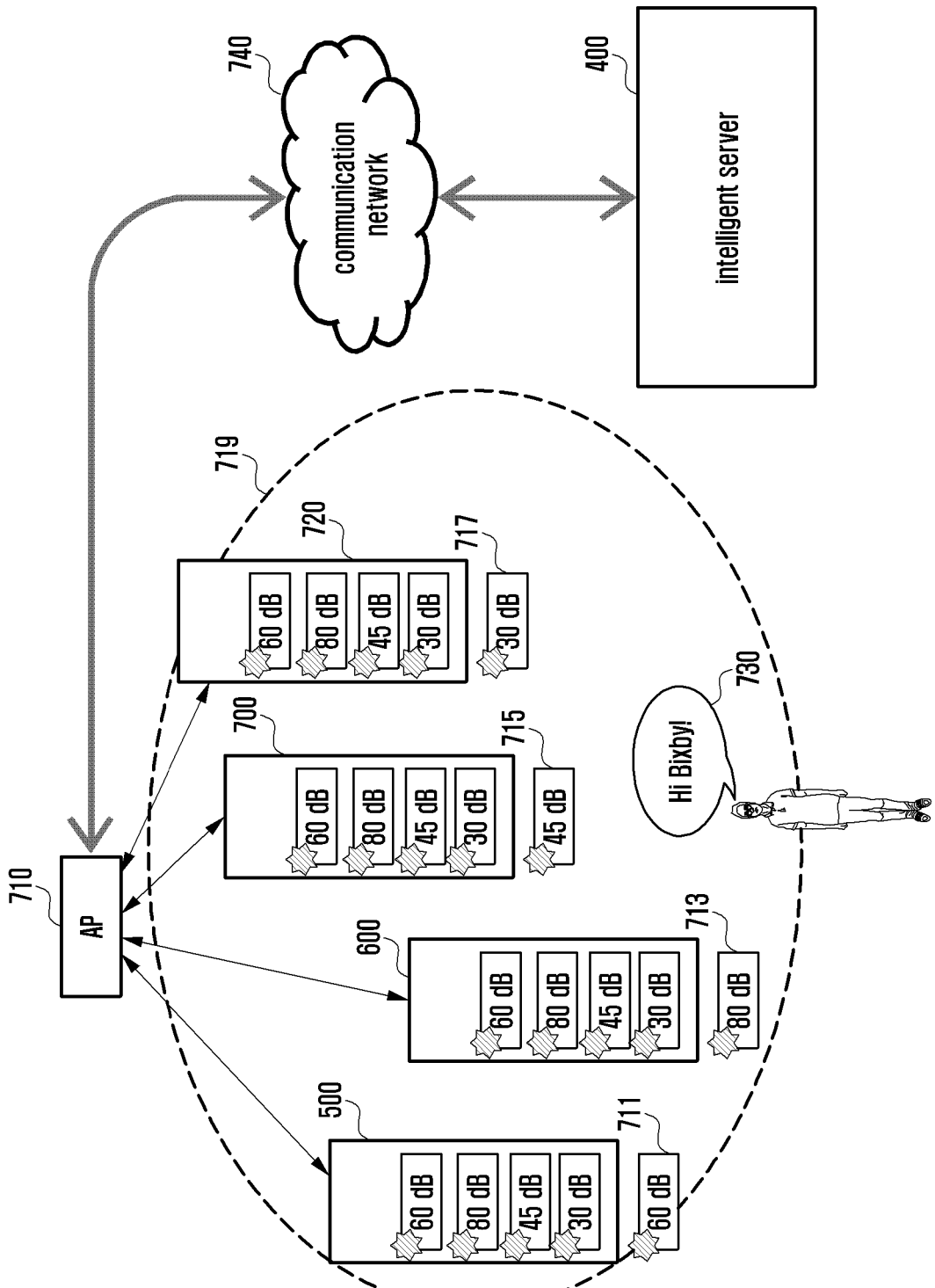
FIG. 7 is a diagram illustrating an operation for determining an electronic device responsible for transmitting speech information following a wakeup utterance to an external electronic device according to an embodiment of the disclosure.

FIG. 7 is a diagram illustrating an operation for determining an electronic device responsible for transmitting speech information to an external electronic device following a wakeup utterance according to an embodiment of the disclosure.

Referring to FIG. 7, a first electronic device (e.g., the first electronic device 500 in FIG. 3), a second electronic device (e.g., the second electronic device 600 in FIG. 3), a third electronic device (e.g., the third electronic device 700), and a fourth electronic device 720 may connect to an access point (AP) 710 of a short range communication network (e.g., Wi-Fi network). The electronic devices may access an intelligent server (e.g., the intelligent server 400 in FIG. 3) via the AP 710 and a communication network 740. The communication network may be a network implemented with various communication means (e.g., cellular network) that is capable of transmitting/receiving data to/from the intelligent server 400.

According to various embodiments of the disclosure, the second electronic device 600, the third electronic device 700, and the fourth electronic device 720 may each include components identical in functionality with the components (e.g., the UI 510, the speaker 520, the microphone 530, the processor 540, the memory 550, and the communication circuit 560) of the first electronic device 500. At least one of the first electronic device 500, the second electronic device 600, the third electronic device 700, or the fourth electronic device 720 may transmit a user's speech information via a short range communication network established by the AP 710. The intelligent server 400 may receive the user's speech information and execute an operation associated with a speech-based intelligent assistance service based on the speech information. The first electronic device 500, the second electronic device 600, the third electronic device 700, and the fourth electronic device 720 may be located within an area 719 where they can receive a wakeup utterance of a user.

According to various embodiments of the disclosure, the first electronic device 500, the second electronic device 600, the third electronic device 700, or the fourth electronic device 720 may receive the wakeup utterance made by the user with a microphone (e.g., the microphone 530 in FIG. 5). The first electronic device 500, the second electronic device 600, the third electronic device 700, and the fourth electronic device 720 may generate first information including an SNR 711, an SNR 713, an SNR 715, and an SNR 717, respectively on the wakeup utterance received through the microphone 530.

According to various embodiments of the disclosure, the first information may include an SNR of the wakeup utterance received at each electronic device. In reference to FIG. 7, the SNR 711 of a wakeup utterance 730 received at the first electronic device 500 may be 60 dB, the SNR 713 of the wakeup utterance 730 received at the second electronic device 600 may be 80 dB, the SNR 715 of the wakeup utterance 730 received at the third electronic device 700 may be 45 dB, and the SNR 717 of the wakeup utterance 730 received at the fourth electronic device 720 may be 30 dB.

According to various embodiments of the disclosure, the first electronic device 500, the second electronic device 600, the third electronic device 700, or the fourth electronic device 720 may broadcast the first information.

According to various embodiments of the disclosure, the first electronic device 500, the second electronic device 600, the third electronic device 700, and the fourth electronic device 720 may each output an audio sound including the first information by means of a speaker (e.g., the speaker 520 in FIG. 5).

According to various embodiments of the disclosure, the first electronic device 500, the second electronic device 600, the third electronic device 700, and the fourth electronic device 720 may broadcast the first information using the network established by the AP 710. The first information may be broadcast by the respective electronic devices with no intervention of the AP 710.

According to various embodiments of the disclosure, the first electronic device 500, the second electronic device 600, the third electronic device 700, and the fourth electronic device 720 may receive second information associated with the wakeup utterance 730. The second information may include the SNR of the wakeup utterance 730 received at another electronic device (e.g., the second electronic device 600, the third electronic device 700, and the fourth electronic device 720) rather than the electronic device itself (e.g., the first electronic device 500).

According to various embodiments of the disclosure, the first electronic device 500, the second electronic device 600, the third electronic device 700, and the fourth electronic device 720 may each compare the first information and the second information to determine whether to transmit the user's speech information following the wakeup utterance 730 to the intelligent server based on a result of the comparison.

For example, the first electronic device 500 may verify that the SNR 711 of the wakeup utterance 730 received by the first electronic device 500 (i.e., 63 dB) is less than the SNR 713 of the wakeup utterance 730 received by the second electronic device 600 (i.e., 80 dB). In this case, the first electronic device 500 may determine not to transmit the user's speech information following the wakeup utterance 730 to the intelligent server 400.

For example, the second electronic device 600 may verify that the SNR 713 of the wakeup utterance 730 received by the second electronic device 600 (i.e., 80 dB) is greater than the SNR of the wakeup utterance 730 received by any of the other electronic devices. In this case, the second electronic device 600 may determine to transmit the user's speech information following the wakeup utterance 730 to the intelligent server 400. For example, if no second information is received from the other electronic devices in a predetermined time, the second electronic device 600 may transmit the received user's speech information to the intelligent server 400 via the AP 710.

For example, the third electronic device 700 may verify that the SNR 715 of the wakeup utterance 730 received by the third electronic device 700 (i.e., 45 dB) is less than the SNR 713 of the wakeup utterance 730 received by the second electronic device 600 (i.e., 80 dB). In this case, the third electronic device 700 may determine not to transmit the user's speech information following the wakeup utterance 730 to the intelligent server 400.

For example, the fourth electronic device 720 may verify that the SNR 717 of the wakeup utterance received by the fourth electronic device 720 is less than the SNR 713 of the wakeup utterance 730 received by the second electronic device 600 (i.e., 80 dB). In this case, the fourth electronic device 720 may determine not to transmit the user's speech information following the wakeup utterance 730 to the intelligent server 400.

Figure 8:
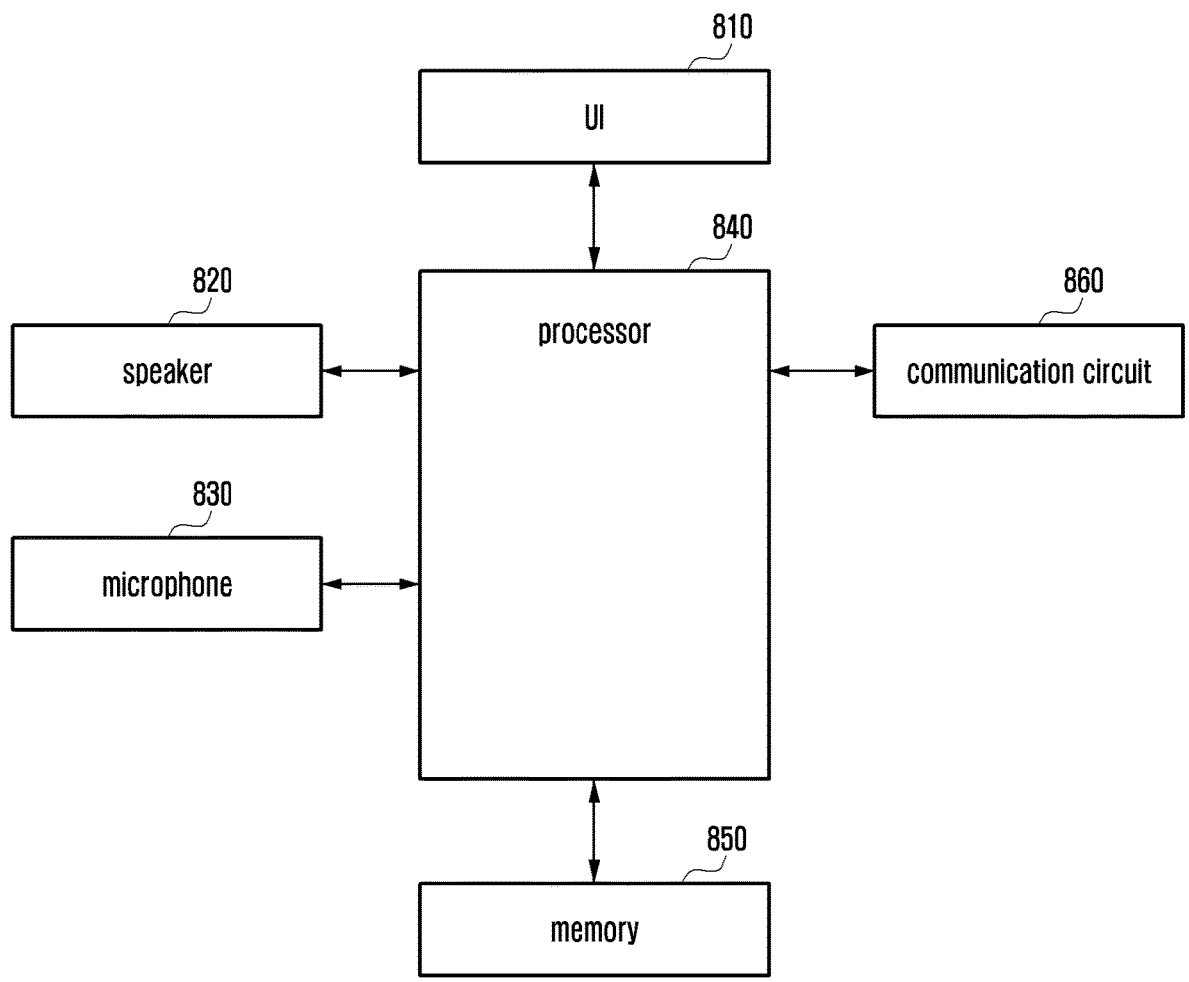
FIG. 8 is a block diagram illustrating a user terminal according to an embodiment of the disclosure.

FIG. 8 is a block diagram illustrating a user terminal according to an embodiment of the disclosure.

Referring to FIG. 8, the user terminal (e.g., the user terminal 300 in FIG. 3) may include a user interface (UI) 810, a speaker 820, a microphone 830, a processor 840, a memory 850, and a communication circuit 860.

According to various embodiments of the disclosure, the UI 810 may mean a medium for the user terminal 300 to receive an input made by a user or output information to the user.

According to various embodiments of the disclosure, the speaker 820 may output various audio sounds under the control of the processor 840.

According to various embodiments of the disclosure, the audio sounds may be signals being transmitted in a frequency band difficult to be heard by a user and transmitted by means of the speaker 820. For example, the audio sounds may be signals being transmitted in a frequency range from 17 KHz to 25 KHz.

According to various embodiments of the disclosure, the microphone 830 may pick up audio sounds around the user terminal 300. The microphone 830 may receive a speech input of the user. For example, the microphone 830 may receive a wakeup utterance of the user for calling the speech-based intelligent assistance service and send speech information corresponding to the wakeup utterance to the processor 840.

According to various embodiments of the disclosure, the communication circuit 860 may be configured to connect to a cellular network (e.g., 3G network, LTE network, 5G network, WiBro network, and WiMax network) or a short range wireline/wireless communication network (e.g., Wi-Fi network, Zigbee network, and LAN). According to various embodiments of the disclosure, the communication circuit 860 may transmit/receive various pieces of data to/from the intelligent server (e.g., the intelligent server 400 in FIG. 3) under the control of the processor 840.

According to various embodiments of the disclosure, the processor 840 may receive a wakeup utterance for calling the speech-based intelligent assistance service through the microphone 830. Upon receipt of the wakeup utterance, the processor 840 may generate first information associated with the wakeup utterance.

According to various embodiments of the disclosure, the first information may include at least part of a wakeup utterance reception time at the user terminal 300, an SNR of the wakeup utterance at the user terminal 300, a quality of the wakeup utterance at the user terminal 300, a priority of the user terminal 300, and information on the user terminal 300.

According to various embodiments of the disclosure, the quality of the wakeup utterance may mean a clarity degree of the wakeup utterance. The quality of the wakeup utterance may include the SNR of the wakeup utterance. The SNR of the wakeup utterance may mean a ratio of a size of the noise to a size of the wakeup utterance. The priority of the user terminal 300 may mean a priority of the electronic device for processing a user input following the wakeup utterance among the electronic devices received the wakeup utterance. The information on the user terminal 300 may be various kinds of information such as identity information (e.g., IMEI and MAC address), a kind of the first electronic device (e.g., refrigerator, speaker, and mobile device), and information indicating whether the user terminal 300 includes a specific component (e.g., a display) capable of outputting data.

According to various embodiments of the disclosure, one or more other electronic devices (e.g., the first electronic device 500 and the second electronic device 600 in FIG. 3) may also receive the wakeup utterance of the user. The first and second electronic devices 500 and 600 may each determine whether to transmit the user's speech information following the wakeup utterance based on a result of a wakeup utterance-associated information (e.g., SNR of wakeup utterance) comparison. Hereinafter, it is assumed that the first electronic device 500 is determined as an electronic device responsible for transmitting a user's speech information following the wakeup utterance for convenience of explanation.

According to various embodiments of the disclosure, the user terminal 300 and the first electronic device 500 may use different networks. The user terminal 300 may transmit/receive data to/from the intelligent server 400 via a first network (e.g., cellular network). The first electronic device 500 may transmit/receive data to/from the intelligent server 400 via a second network (e.g., short range communication network). The first electronic device 500 may transmit information on the wakeup utterance in a communication mode provided by the second network and, in this case, the user terminal 300 and the first electronic device 500 may not directly communicate data with each other. According to various embodiments of the disclosure, the user terminal 300 and the second electronic device 600 may directly communicate data using audio sounds.

According to various embodiments of the disclosure, the processor may control the speaker 820 to broadcast an audio sound including the first information.

According to various embodiments of the disclosure, the first electronic device 500 may output an audio sound including second information indicative of transmitting a user's speech information following the wakeup utterance. The processor 840 may receive the audio sound including the second information by means of the microphone 830. According to various embodiments of the disclosure, the processor 840 may compare the first information and the second information to determine whether to transmit the speech information following the wakeup utterance to the intelligent server 400 based on a comparison result.

For example, the processor 840 may compare the SNR measured by the user terminal 300 and the SNR included in the second information. If the SNR measured by the user terminal 300 is greater than the SNR included in the second information, this may indicate that the user terminal 300 has an environment superior to that of the first electronic device 500 for receiving a user's speech following the wakeup utterance. The processor 840 may determine to transmit the user's speech following the wakeup utterance to the intelligent server 400 based on a determination that the SNR of the wakeup utterance that is measured at the user terminal 300 is greater than the SINR of the wakeup utterance that is included in the second information. The processor 840 may determine not to transmit the user's speech following the wakeup utterance to the intelligent server 400 based on a determination that the SNR of the wakeup utterance that is measured by the user terminal 300 is less than the SNR of the wakeup utterance that is included in the second information. In this case, the first electronic device 500 may transmit the user's speech following the wakeup utterance to the intelligent server 400.

For example, the processor 840 may compare the quality of the wakeup utterance that is measured by the user terminal 300 and the quality of the wakeup utterance that is included in the second information. If the quality of the wakeup utterance that is measured by the user terminal 300 is better than the quality of the wakeup utterance that is included in the second information, this may indicate that the user terminal has an environment superior to that of the first electronic device 500 for receiving the user's speech following the wakeup utterance.

According to various embodiments of the disclosure, the processor 840 may compare the priority of the user terminal 300 and the priority of the first electronic device 500 that is included in the second information. The priority may mean a priority for determining the electronic device to process the user's speech preferentially. The processor 840 may determine to transmit the user's speech following the wakeup utterance to the intelligent server 400 based on a determination that the priority of the user terminal 300 is high.

The above embodiment may obviate the need for the intelligent server 400 to select an electronic device to which a speech information processing result is transmitted, resulting in further reduction of load on the intelligent server.

According to an alternative embodiment of the disclosure, the processor 840 may transmit the user's speech information received after the wakeup utterance and at least part of the second information (e.g., information indicative of receipt of the second information and SNR information included in the second information) to the intelligent server 400. The intelligent server 400 may determine whether the data transmitted by the user terminal 300 includes the second information. The intelligent server 400 may wait until the user's speech information following the wakeup utterance that is transmitted by the first electronic device is received, based on a determination that the data transmitted by the user terminal 300 includes the second information. The intelligent server 400 may select one of the user terminal 300 and the first electronic device 500 as a target device to which a speech information processing result is to be transmitted. The intelligent server 400 is described later in detail with reference to FIG. 11.

According to various embodiments of the disclosure, if it is determined for the user terminal 300 to transmit data to the intelligent server via the cellular network, the user terminal 300 may be able to transmit data faster than the first electronic device 500 that transmits data to the intelligent server via the short range communication network. The user terminal 300 may transmit information indicating whether the first electronic device 500 transmits speech information to the intelligent server 400, thereby protecting against redundant speech information processing of the intelligent server 400 and reducing load on the intelligent server 400.

According to various embodiments of the disclosure, the memory 850 may store instructions executable by the processor 840 to accomplish the above described operations.

Figure 9:
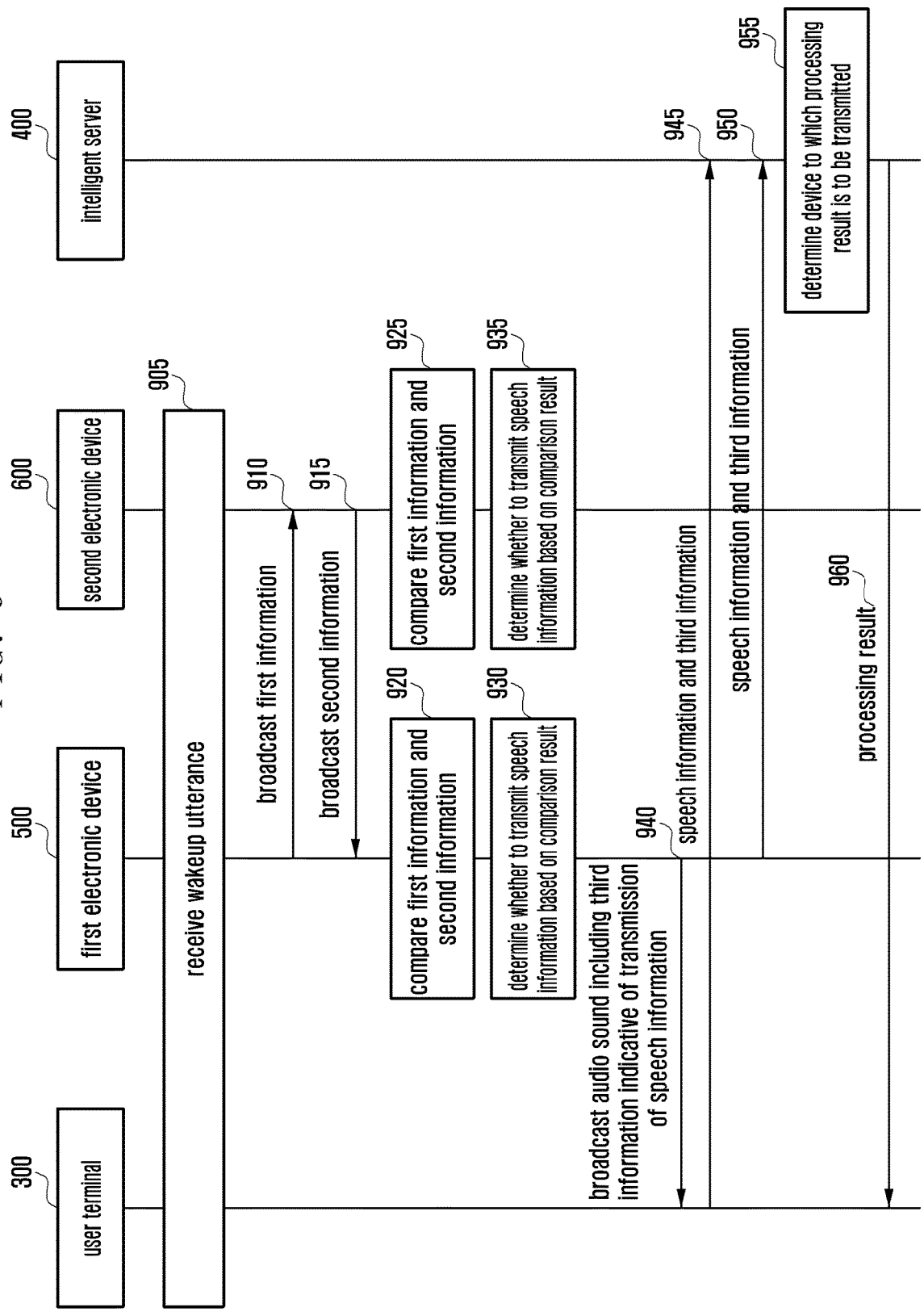
FIG. 9 is a signal flow diagram illustrating signal flows among a user terminal, a first electronic device, a second electronic device, and an external server according to an embodiment of the disclosure.

FIG. 9 is a signal flow diagram illustrating signal flows among a user terminal, a first electronic device, a second electronic device, and an external server according to an embodiment of the disclosure.

Referring to FIG. 9, according to various embodiments of the disclosure, the user terminal (e.g., the user terminal 300 in FIG. 3), the first electronic device (e.g., the first electronic device 500 in FIG. 3), and the second electronic device (e.g., the second electronic device 600 in FIG. 3) may receive, at operation 905, a wakeup utterance made by a user. For example, the user terminal 300, the first electronic device 500, and the second electronic device 600 may be located close to one another to receive the wakeup utterance made by the user.

According to various embodiments of the disclosure, the first and second electronic devices 500 and 600 may be connected to the same network (e.g., short range communication network), and the user terminal 300 may be connected to another network (e.g., cellular network) that is different from the network to which the first and second electronic devices 500 and 600 are connected.

According to various embodiments of the disclosure, the first electronic device 500 may broadcast, at operation 910, first information associated with the wakeup utterance.

According to various embodiments of the disclosure, the first information may include a wakeup utterance reception time at the first electronic device 500, an SNR of the wakeup utterance at the first electronic device 500, a quality of the wakeup utterance at the first electronic device 500, a priority of the first electronic device 500, and information on the first electronic device 500.

According to various embodiments of the disclosure, the quality of the wakeup utterance may mean a clarity degree of the wakeup utterance. The quality of the wakeup utterance may include the SNR of the wakeup utterance. The SNR of the wakeup utterance may mean a ratio of a size of the noise to a size of the wakeup utterance.

The priority of the first electronic device 500 may mean a priority of the electronic device for processing a user input following the wakeup utterance among the electronic devices received the wakeup utterance. The information on the first electronic device 500 may be various kinds of information such as identity information (e.g., IMEI and MAC address), a kind of the first electronic device (e.g., refrigerator and speaker), and information indicating whether the first electronic device 500 includes a specific component (e.g., display) capable of outputting data.

According to various embodiments of the disclosure, the second electronic device 600 may broadcast, at operation 915, second information associated with the wakeup utterance.

According to various embodiments of the disclosure, the second information may include at least part of a wakeup utterance reception time at the second electronic device 600, an SNR of the wakeup utterance at the second electronic device 600, a quality of the wakeup utterance at the second electronic device 600, a priority of the second electronic device 600, and information on the second electronic device 600.

According to various embodiments of the disclosure, the first and second information may be broadcast using a short range communication network (e.g., Wi-Fi, Bluetooth™, and Zigbee network).

According to various embodiments of the disclosure, the first electronic device 500 may compare the first information and the received second information at operation 920. The second electronic device 600 may compare the received first information and the received second information at operation 925.

According to various embodiments of the disclosure, the first and second electronic devices 500 and 600 may determine at respective operations 930 and 935 whether to transmit the user's speech information following the wakeup utterance to the intelligent server 400 based on the comparison results.

According to various embodiments of the disclosure, the first electronic device 500 may compare the SNR of the wakeup utterance that is included in the first information and the SNR of the wakeup utterance that is included in the second information. If the SNR of the wakeup utterance that is included in the first information is greater than the SINR of the wakeup utterance that is included in the second information, this may indicate that the first electronic device 500 has an environment superior to that of the second electronic device 600 for receiving the user's speech following the wakeup utterance. The first electronic device 500 may determine to transmit the user's speech following the wakeup utterance to the intelligent server 400 based on determining that the SNR of the wakeup utterance that is measured at the first electronic device 500 is greater than the SINR of the wakeup utterance that is included in the second information. The first electronic device 500 may determine not to transmit the user's speech following the wakeup utterance to the intelligent server 400 based on determining that the SNR of the wakeup utterance that is included in the first information is less than the SNR of the wakeup utterance that is included in the second information. In this case, the second electronic device 600 may determine to transmit the user's speech following the wakeup utterance to the intelligent server 400.

According to various embodiments of the disclosure, the first and second electronic devices 500 and 600 may each compare the quality of the wakeup utterance that is included in the first information and the quality of the wakeup utterance that is included in the second information. If the quality of the wakeup utterance that is included in the first information is better than the quality of the wakeup utterance that is included in the second information, this may indicate that the first electronic device 500 has an environment superior to that of the second electronic device 600 for receiving the user's speech following the wakeup utterance. The first electronic device 500 may determine to transmit the user's speech following the wakeup utterance to the intelligent server 400 based on a determination that the quality of the wakeup utterance that is included in the first information is better than the quality of the wakeup utterance that is included in the second information. In this case, the second electronic device 600 may determine not to transmit the user's speech following the wakeup utterance to the intelligent server 400.

According to various embodiments of the disclosure, the first electronic device 500 may determine not to transmit the user's speech following the wakeup utterance to the intelligent server 400 based on a determination that the quality of the wakeup utterance that is included in the first information is worse than the quality of the wakeup utterance that is included in the second information. In this case, the second electronic device 600 may determine to transmit the user's speech following the wakeup utterance to the intelligent server 400.

According to various embodiments of the disclosure, the first electronic device 500 may compare the priority of the first electronic device 500 that is included in the first information and the priority of the second electronic device 600 that is included in the second information. The priority may mean a priority for determining the electronic device to process the user's speech preferentially. The first electronic device 500 may determine to transmit the user's speech following the wakeup utterance to the intelligent server 400 based on a determination that the priority of the first electronic device 500 is higher than that of the second electronic device 600.

Hereinafter, it is assumed that the first electronic device 500 determines to transmit the user's speech information following the wakeup utterance to the intelligent server 400 for convenience of explanation.

According to various embodiments of the disclosure, the first electronic device 500 may broadcast an audio sound including third information indicative of transmission of speech information to the intelligent server 400 by means of a speaker (e.g., the speaker 520 in FIG. 5).

According to various embodiments of the disclosure, the user terminal 300 may receive, at operation 940, the third information broadcast by the first electronic device 500 and transmit, at operation 945, the speech information received after the wakeup utterance and the third information to the intelligent server 400. According to an embodiment, the second electronic device 600 may receive the third information broadcast by the first electronic device 500; in this case, the corresponding information may be ignored. According to various embodiments of the disclosure, the intelligent server 400 may determine whether the data transmitted by the user terminal 300 includes the third information. The user terminal 300 may wait for receiving the third information during a predetermined time period after the receipt of the wakeup utterance. If the third information is received in a predetermined time, the user terminal may transmit at least part of the received third information to the intelligent server 400. The intelligent server 400 may wait until the user's speech information following the wakeup utterance is received from the first electronic device 500 based on a determination that the data transmitted by the user terminal 330 includes the third information.

According to various embodiments of the disclosure, the first electronic device 500 may transmit, at operation 950, the speech information received after the wakeup utterance to the intelligent server 400.

According to various embodiments of the disclosure, the intelligent server 400 may process the speech-based intelligence assistance service based on the speech information and determine, at operation 955, an electronic device to which a processing result is to be transmitted. How to determine the electronic device to which the processing result is to be transmitted is described later in detail with reference to FIG. 11.

According to various embodiments of the disclosure, the intelligent server 400 may transmit the service processing result to the determined electronic device (e.g., the user terminal 300) at operation 960.

According to various embodiments of the disclosure, the user terminal 300 may predetermine whether there is any electronic device to receive the wakeup utterance around the user terminal 300. The user terminal 300 may broadcast a signal for discovering a presence of the first electronic device 500, the second electronic device 600, the third electronic device 700, or the fourth electronic device 720 using an audio sound. The first electronic device 500, the second electronic device 600, the third electronic device 700, or the fourth electronic device 720 may transmit a response signal to the user terminal in reply to the signal for discovering the presence of the first electronic device 500, the second electronic device 600, the third electronic device 700, or the fourth electronic device 720. The user terminal 300 may identify the presence of the first electronic device 500, the second electronic device 600, the third electronic device 700, or the fourth electronic device 720 based on the receipt of the response signal. The user terminal 300 may transmit to the intelligent server 400 a signal indicating the presence of the first electronic device 500, the second electronic device 600, the third electronic device 700, or the fourth electronic device 720. The user terminal 300 may transmit to the intelligent server 400 the signal indicating the presence of the first electronic device 500, the second electronic device 600, the third electronic device 700, or the fourth electronic device 720 regardless of operations 910, 915, 920, 925, 930, 935, 940, 945, and 950.

According to various embodiments of the disclosure, the user terminal 300 may receive a wakeup utterance of the user again after operation 960. In this case, the user terminal 300 discovers the presence of the first electronic device 500, the second electronic device 600, the third electronic device 700, or the fourth electronic device 720 and transmits to the intelligent server 400 the signal indicating the presence of the first electronic device 500, the second electronic device 600, the third electronic device 700, or the fourth electronic device 720.

According to various embodiments of the disclosure, if the intelligent server 400 receives the signal indicating the presence of the first electronic device 500, the second electronic device 600, the third electronic device 700, or the fourth electronic device 720, it may suspend processing the speech information transmitted by the user terminal 300 until the speech information is received from the first electronic device 500.

According to an embodiment, the user terminal 300 may predetermine whether there is any electronic device capable of receiving the wakeup utterance around the user terminal 300 based on a signal received from an external electronic device. For example, the user terminal 300 may receive an audio sound from the first electronic device 500, the second electronic device 600, the third electronic device 700, or the fourth electronic device 720 and transmit a signal indicating the presence of external electronic devices around the user terminal to the intelligent server 400. The user terminal 300 may transmit the signal indicating the presence of the first electronic device 500, the second electronic device 600, the third electronic device 700, or the fourth electronic device 720 to the intelligent server 400 regardless of operations 910, 915, 920, 925, 930, 935, 940, 945, and 950.

Figure 10:
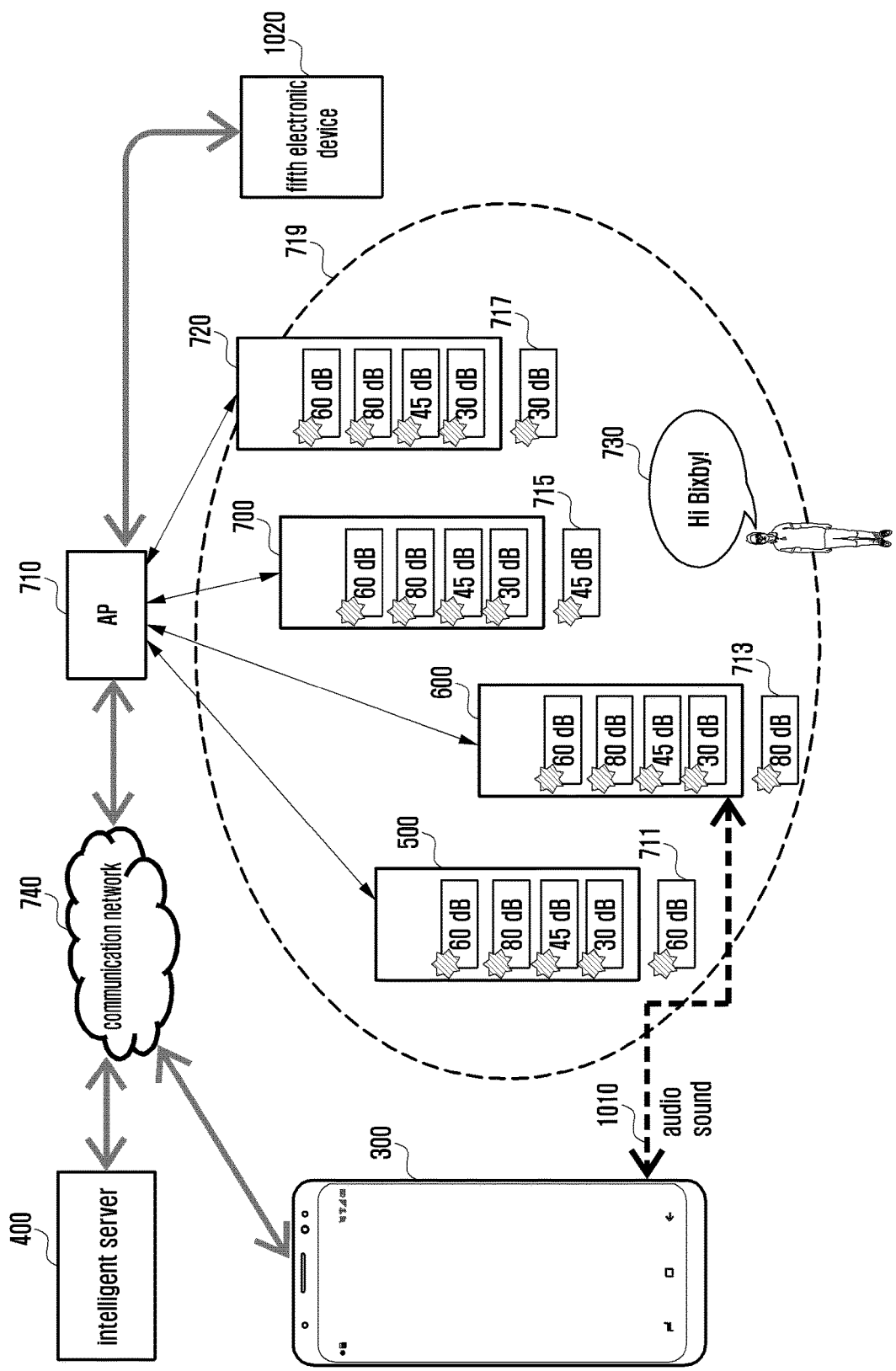
FIG. 10 is a diagram illustrating an operation for determining an electronic device responsible for transmitting speech information following a wakeup utterance to an external server according to an embodiment of the disclosure.

FIG. 10 is a diagram illustrating an operation for determining an electronic device responsible for transmitting speech information following a wakeup utterance to an external server according to an embodiment of the disclosure.

Referring to FIG. 10, a first electronic device (e.g., the first electronic device 500 in FIG. 3), a second electronic device (e.g., the second electronic device 600 in FIG. 3), a third electronic device (e.g., the third electronic device 700 in FIG. 3), the fourth electronic device 720, and a fifth electronic device 1020 may connect to an AP (e.g., the AP 710 in FIG. 7) via a short range communication network (e.g., Wi-Fi network). The AP 710 and the user terminal 300 may connect to the intelligent server 400 via the communication network 740. The communication network 740 may be a network implemented with various communication means (e.g., cellular network) that is capable of transmitting/receiving data to/from the intelligent server 400.

According to various embodiments of the disclosure, the user terminal 300, the first electronic device 500, the second electronic device 600, the third electronic device 700, and the fourth electronic device 720 may be located within the area 719 where they can receive a wakeup utterance of a user. The fifth electronic device 1020 may be located out of the area where the wakeup utterance of the user can be received. For example, the user is in a specific space (e.g., a room) and the user's utterance may be heard only within the room in a case where the user terminal 300, the first electronic device 500, the second electronic device 600, the third electronic device 700, and the fourth electronic device 720 are located inside the room while the fifth electronic device 1020 is located outside the room.

According to various embodiments of the disclosure, the intelligent server (e.g., the intelligent server 400 in FIG. 3) may receive the user's speech information transmitted by one of the first electronic device 500, the second electronic device 600, the third electronic device 700, and the fourth electronic device (e.g., the fourth electronic device 720 in FIG. 7) via a short range communication network established by the AP 710 and execute an operation related to a speech-based intelligence assistance service based on the speech information. The user terminal (e.g., the user terminal 300 in FIG. 3) may be connected to a cellular network rather than the short range communication network established by the AP 710.

According to various embodiments of the disclosure, the first electronic device 500, the second electronic device 600, the third electronic device 700, and the fourth electronic device 720 may receive the wakeup utterance 730 made by the user by means of a microphone (e.g., the microphone 530 in FIG. 5). The first electronic device 500, the second electronic device 600, the third electronic device 700, and the fourth electronic device 720 may each generate first information on the wakeup utterance received through the microphone 530 as denoted by the SNR 711, the SNR 713, the SNR 715, and the SNR 717.

According to various embodiments of the disclosure, the first information may include an SNR of the wakeup utterance received at each electronic device. In reference to FIG. 10, the SNR 711 of the wakeup utterance 730 received at the first electronic device 500 may be 60 dB, the SNR 713 of the wakeup utterance 730 received at the second electronic device 600 may be 80 dB, the SNR 715 of the wakeup utterance 730 received at the third electronic device 700 may be 45 dB, and the SNR 717 of the wakeup utterance 730 received at the fourth electronic device 720 may be 30 dB.

According to various embodiments of the disclosure, the first electronic device 500, the second electronic device 600, the third electronic device 700, and the fourth electronic device 720 may broadcast the first information. The fifth electronic device 1020 may neither receive the user's wakeup utterance nor broadcast the first information.

According to various embodiments of the disclosure, the first information may be broadcast via a short range communication network to which the first electronic device 500, the second electronic device 600, the third electronic device 700, and the fourth electronic device 720 are connected.

According to various embodiments of the disclosure, the first electronic device 500, the second electronic device 600, the third electronic device 700, and the fourth electronic device 720 may broadcast the first information using a network established by the AP 710. The first information may be broadcast by the respective electronic devices with no intervention of the AP 710. For example, the first information may be broadcast via a short range communication network to which the first electronic device 500, the second electronic device 600, the third electronic device 700, and the fourth electronic device 720 may broadcast the first information in a Wi-Fi Direct communication mode which obviates the need of an intervention of the AP 710.

According to various embodiments of the disclosure, the first electronic device 500, the second electronic device 600, the third electronic device 700, and the fourth electronic device 720 may receive second information associated with the wakeup utterance 730. The second information may include the SNR of the wakeup utterance 730 received at another electronic device (e.g., the second electronic device 600, the third electronic device 700, and the fourth electronic device 720) rather than the electronic device itself (e.g., the first electronic device 500).

According to various embodiments of the disclosure, the first electronic device 500, the second electronic device 600, the third electronic device 700, and the fourth electronic device 720 may each compare the first information and the second information to determine whether to transmit user's speech information following the wakeup utterance 730 to the intelligent server based on a result of the comparison.

For example, the first electronic device 500 may verify that the SNR 711 of the wakeup utterance 730 received by the first electronic device 500 (i.e., 63 dB) is less than the SNR 713 of the wakeup utterance 730 received by the second electronic device 600 (i.e., 80 dB). In this case, the first electronic device 500 may determine not to transmit the user's speech information following the wakeup utterance 730 to the intelligent server 400.

For example, the second electronic device 600 may verify that the SNR 713 of the wakeup utterance 730 received by the second electronic device 600 (i.e., 80 dB) is greater than the SNR of the wakeup utterance 730 received by any of the other electronic devices. In this case, the second electronic device 600 may determine to transmit the user's speech information following the wakeup utterance 730 to the intelligent server 400.

For example, the third electronic device 700 may verify that the SNR 715 of the wakeup utterance 730 received by the third electronic device 700 (i.e., 45 dB) is less than the SNR 713 of the wakeup utterance 730 received by the second electronic device 600 (i.e., 80 dB). In this case, the third electronic device 700 may determine not to transmit the user's speech information following the wakeup utterance 730 to the intelligent server 400.

For example, the fourth electronic device 720 may verify that the SNR 717 of the wakeup utterance received by the fourth electronic device 720 is less than the SNR 713 of the wakeup utterance 730 received by the second electronic device 600 (i.e., 80 dB). In this case, the fourth electronic device 720 may determine not to transmit the user's speech information following the wakeup utterance 730 to the intelligent server 400.

According to various embodiments of the disclosure, the first electronic device 500 may output an audio sound 1010 including third information indicative of transmission of the user's speech information following the wakeup utterance 730 to the intelligent server 400. The third information may include at least part of a wakeup utterance reception time at the first electronic device 500, an SNR of the wakeup utterance at the first electronic device 500, a priority of the first electronic device 500, and device information of the first electronic device 500.

According to various embodiments of the disclosure, the user terminal 300 may receive the wakeup utterance made by the user. The user terminal 300 may wait for receiving the third information during a predetermined time period after the receipt of the wakeup utterance. If the user terminal 300 fails to receive the third information during the predetermined time period, it may transmit speech information received after the wakeup utterance to the intelligent server 400.

According to various embodiments of the disclosure, the user terminal 300 may receive the third information transmitted by the first electronic device 500 during the predetermined time period. The user terminal 300 may transmit a user's speech information received after the wakeup utterance and the third information to the intelligent server 400.

According to various embodiments of the disclosure, the user terminal may broadcast an audio sound including fourth information. The fourth information may include at least part of a wakeup utterance reception time at the user terminal 300, an SNR of the wakeup utterance at the user terminal 300, a quality of the wakeup utterance at the user terminal 300, a priority of the user terminal 300, and information on the user terminal. Upon receipt of the audio sound including the third information, the user terminal 300 may broadcast the audio sound including the fourth information by means of a speaker (e.g., the speaker 820 in FIG. 8).

According to various embodiments of the disclosure, the user terminal 300 may compare the SNR included in the third information and the SNR measured by the user terminal 300 (which may be included in the fourth information). The first electronic device 500 may compare the SNR included in the fourth information and the SNR measured by the first electronic device (which may be included in the third information).

According to various embodiments of the disclosure, the user terminal 300 and the first electronic device 500 may each determine whether to transmit speech information following the wakeup utterance to the intelligent server 400 based on at least part of an SNR comparison result.

According to various embodiments of the disclosure, if the SNR measured by the user terminal 300 is greater than the SNR included in the third information, this may indicate that the user terminal 300 has an environment superior to that of the first electronic device 500 for receiving a user's speech following the wakeup utterance. The user terminal 300 may determine to transmit the user's speech following the wakeup utterance to the intelligent server 400 based on a determination that the SNR of the wakeup utterance that is measured at the user terminal 300 is greater than the SINR of the wakeup utterance that is included in the third information. The first electronic device 500 may determine not to transmit the user's speech following the wakeup utterance to the intelligent server 400 based on a determination that the SNR of the wakeup utterance that is included in the fourth information is less than the SNR of the wakeup utterance that is measured at the first electronic device 500.

According to various embodiments of the disclosure, if the quality of the wakeup utterance that is measured by the user terminal 300 is better than the quality of the wakeup utterance that is measured at the first electronic device 500, this may indicate that the user terminal has an environment superior to that of the first electronic device 500 for receiving the user's speech following the wakeup utterance. The user terminal 300 may determine to transmit the user's speech following the wakeup utterance to the intelligent server 400 based on a determination that the quality of the wakeup utterance that is measured at the user terminal 300 is better than the quality of the wakeup utterance that is included in the third information. In this case, the first electronic device 500 may determine not to transmit the user's speech following the wakeup utterance to the intelligent server 400.

According to various embodiments of the disclosure, the user terminal 300 may determine not to transmit the user's speech following the wakeup utterance to the intelligent server 400 based on a determination that the quality of the wakeup utterance that is measured at the user terminal 300 is worse than the quality of the wakeup utterance included in the third information. In this case, the first electronic device 500 may determine to transmit the user's speech following the wakeup utterance to the intelligent server 400.

According to various embodiments of the disclosure, the user terminal 300 may compare a priority of the user terminal 300 and a priority of the first electronic device 500 that is included in the third information. The priority may mean a priority for determining the electronic device to process the user's speech preferentially. The user terminal 300 may determine to transmit the user's speech following the wakeup utterance to the intelligent server 400 based on a determination that the priority of the first electronic device 500 is high.

An audio sound is characterized by a short propagation distance and poor straightness in comparison with a signal of other communication means (e.g., short range communication network). Because of these characteristics, the electronic devices (e.g., the user terminal 300, the first electronic device 500, the second electronic device 600, the third electronic device 700, and the fourth electronic device 720) located close to the user who makes the wakeup utterance can receive the corresponding audio sound while the electronic devices (e.g., fifth electronic device 1050) located far from the user who makes the wakeup utterance may not receive the corresponding audio sound. The method for transmitting the first information using an audio sound is capable of preventing the electronic devices (e.g., the fifth electronic device 1020) far from the user who makes a wakeup utterance from receiving the third information and the fourth information so as to reduce unnecessary load on the electronic devices (e.g., the fifth electronic device 1020) located far from the user.

Figure 11:
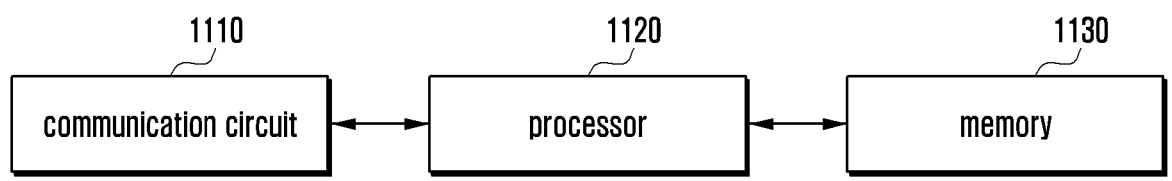
FIG. 11 is a block diagram illustrating a configuration of an intelligent server according to an embodiment of the disclosure.

FIG. 11 is a block diagram illustrating a configuration of an intelligent server according to an embodiment of the disclosure.

Referring to FIG. 11, the intelligent server (e.g., the intelligent server 400 in FIG. 3) may include a communication circuit 1110, a processor 1120, and a memory 1130.

According to various embodiments of the disclosure, the communication circuit 1110 may be configured to establish a connection to a cellular network (e.g., 3G, network, LTE network, 5G network, WiBro network, and Wimax network). According to various embodiments of the disclosure, the communication circuit 1110 may transmit/receive various kinds of data related to a speech-based intelligent assistance server with an external electronic device (e.g., the user terminal 300 in FIG. 3, the first electronic device 500 in FIG. 3, the second electronic device 600 in FIG. 3, and the third electronic device 700 in FIG. 3) under the control of the processor 1120.

According to various embodiments of the disclosure, the processor 1120 may receive first information related to a user's speech information following a wakeup utterance for calling for the speech-based intelligent assistance service from the user terminal 300 by means of the communication circuit 1110. The processor 1120 may receive second information related to the user's speech information following the wakeup utterance from the first electronic device 500 by means of the communication circuit 1110.

According to various embodiments of the disclosure, the user terminal 300 may receive a signal indicative of transmission of the user's speech information received after the wakeup utterance from the first electronic device 500.

According to various embodiments of the disclosure, in the case where the user terminal 300 transmits data to the intelligent server 400 via a cellular network, a data rate of the cellular network may typically be greater than that of a short range communication network, and the user terminal 300 may transmit data to the intelligent server 400 faster than the first electronic device 500 that transmits the data to the intelligent server 400 via the short range communication network because of the time necessary for the first electronic device 500 to select an electronic device responsible for transmitting speech information to the intelligent server 400 among the second electronic device 600, the third electronic device 700, and the fourth electronic device 720.

According to various embodiments of the disclosure, the intelligent server 400 may wait for a predetermined time period before processing the first information based on a determination that the first information transmitted by the user terminal 300 includes a signal indicating that the first electronic device 500 is responsible for transmitting a user's speech information. The intelligent server 400 may receive second information transmitted by the first electronic device 500 in a predetermined time period. The intelligent server 400 may process one of the first information and the second information and transmit a processing result to the electronic device that has transmitted the corresponding information. If the user terminal 300 transmits to the intelligent server 400 information indicating whether the first electronic device 500 is responsible for transmitting speech information, this may lead to obviation of redundant speech information processing of the intelligent server 400 and reduction of load on the intelligent server 400.

According to various embodiments of the disclosure, the user terminal 300 may receive a signal indicative of transmission of user's speech information following the wake up utterance from the first electronic device 500 and transmit to the intelligent server 400 the first information including a signal indicating that the first electronic device 500 is responsible for transmitting the user's speech following the wakeup utterance.

According to various embodiments of the disclosure, the processor 1120 may suspend speech information processing until user's speech information that follows the wakeup utterance is received from the first electronic device 500 based on a determination that the first information includes the signal indicating that the first electronic device 500 is responsible for transmitting the user's speech information following the wakeup utterance.

According to various embodiments of the disclosure, the processor 1120 may perform speech information processing upon receipt of the speech information transmitted by the first electronic device. The received speech information may be processed to execute the speech-based intelligent assistance.

According to various embodiments of the disclosure, the processor 1120 may determine an electronic device to which a speech information processing result is to be transmitted. The processor 1120 may select one of the user terminal 300 and the first electronic device 500 and transmit the speech information processing result to the selected electronic device.

According to various embodiments of the disclosure, the processor 1120 may compare the first information transmitted by the user terminal 300 and the second information transmitted by the first electronic device and select one of the two as the electronic device to which a comparison result is to be transmitted.

According to various embodiments of the disclosure, the first information may include a wakeup utterance reception time at the user terminal 300, an SNR of the wakeup utterance at the user terminal 300, a quality of the wakeup utterance at the user terminal 300, a priority of the user terminal 300, and information on the user terminal 300.

According to various embodiments of the disclosure, the second information may include a wakeup utterance reception time at the first electronic device 500, an SNR of the wakeup utterance at the first electronic device 500, a quality of the wakeup utterance at the first electronic device 500, a priority of the first electronic device 500, and information on the first electronic device 500.

According to various embodiments of the disclosure, the SNR of the wakeup utterance may mean a ratio of a size of the noise to a size of the wakeup utterance. The quality of the wakeup utterance may mean a clarity degree of the wakeup utterance. The priority of the electronic device (e.g., the user terminal 300 and the first electronic device 500) may mean a priority of the electronic device for processing a user input following the wakeup utterance among the electronic devices that received the wakeup utterance. The information on the electronic device (e.g., the user terminal 300 and the first electronic device 500) may be various kinds of information such as identity information (e.g., IMEI and MAC address) of the electronic device (e.g., the user terminal 300 and the first electronic device 500), a kind of the electronic device (e.g., the user terminal 300 and the first electronic device 500) (e.g., a refrigerator and a speaker), and information indicating whether the electronic device (e.g., the user terminal 300 and the first electronic device 500) includes a specific component (e.g., a display) capable of outputting data.

According to various embodiments of the disclosure, the processor 1120 may compare the SNR of the wakeup utterance that is included in the first information and the SNR of the wakeup utterance that is included in the second information. If the SNR of the wakeup utterance that is included in the first information is greater than the SINR of the wakeup utterance that is included in the second information, this may indicate that the user terminal 300 has an environment superior to that of the first electronic device 500 for receiving a user's speech following the wakeup utterance. The processor 1120 may determine to transmit the processing result to the user terminal 300 based on a determination that the SNR of the wakeup utterance that is included in the first information is greater than the SINR of the wakeup utterance that is included in the second information. The processor 1120 may determine to transmit the processing result to the first electronic device 500 based on a determination that the SNR of the wakeup utterance that is included in the first information is less than the SINR of the wakeup utterance that is included in the second information.

According to various embodiments of the disclosure, the processor 1120 may compare the quality of the wakeup utterance that is included in the first information and the quality of the wakeup utterance that is included in the second information. If the quality of the wakeup utterance that is included in the first information is better than the quality of the wakeup utterance that is included in the second information, this may indicate that the user terminal 300 has an environment superior to that of the first electronic device for receiving a user's speech following the wakeup utterance. The processor 1120 may determine to transmit the processing result to the user terminal 300 based on a determination that the quality of the wakeup utterance that is included in the first information is better than the quality of the wakeup utterance that is included in the second information.

According to various embodiments of the disclosure, the processor 1120 may determine to transmit the processing result to the first electronic device 500 based on a determination that the quality of the wakeup utterance that is included in the first information is worse than the quality of the wakeup utterance that is included in the second information.

According to various embodiments of the disclosure, the processor 1120 may compare the priority of the user terminal 300 and the priority of the first electronic device. The priority may mean a priority for determining the electronic device to process a user's speech preferentially. The processor 1120 may determine to transmit the processing result to the user terminal 300 based on a determination that the priority of the user terminal 300 is higher than that of the first electronic device 500.

According to various embodiments of the disclosure, the user terminal 300 may include the UI 810, at least one communication circuit (e.g., the communication circuit 860) configured to connect to a cellular network and/or a Wi-Fi network, the microphone 830, at least one speaker (e.g., the speaker 820), at least one processor (e.g., the processor 840) operationally connected to the UI 810, the communication circuit 860, the microphone 830, and the speaker 820, and the memory 850 operationally connected to the processor 840. The memory 850 may store instructions executable by the processor 840 for receiving a wakeup utterance for calling a speech-based intelligent assistance service through the microphone 830, transmitting an audio sound including first information associated with the wakeup utterance through the speaker 820, receiving an audio sound including second information through the microphone 830, and determining whether to control the user terminal 300 to transmit speech information following the wakeup utterance to an external server (e.g., the intelligent server 400) based on at least part of a comparison between the first information and the second information.

According to various embodiments of the disclosure, the instructions may include an instruction executable by the processor 840 for transmitting, at the user terminal 300, speech information following the wakeup utterance to the intelligent server 400 based on the second information being not received in a predetermined period after transmitting the first information.

According to various embodiments of the disclosure, the instructions may include instructions executable by the processor 840 for broadcasting, at the user terminal 300, third information associated with the wakeup utterance on the Wi-Fi network by means of the communication circuit 860, receiving fourth information broadcast by at least one external electronic device (e.g., the first electronic device 500, the second electronic device 600, the third electronic device 700, or the fourth electronic device 720) on the Wi-Fi network by means of the communication circuit 860, and determining whether to transmit, at the user terminal 300, speech information following the wakeup utterance to the intelligent server 400 based on at least part of a comparison between the third information and the fourth information.

According to various embodiments of the disclosure, the first to fourth information may include at least one of an SNR, wakeup utterance reception time information, priority information, and/or category information.

According to various embodiments of the disclosure, the instructions may include an instruction executable by the processor 840 for broadcasting, at the user terminal 300, the third information before transmitting the first information.

According to various embodiments of the disclosure, the instructions may include an instruction executable by the processor 840 for transmitting, at the user terminal 300, speech information following the wakeup utterance to the intelligent server 400 based on the fourth information not being received during a predetermined period after broadcasting the third information.

According to various embodiments of the disclosure, the audio sound is transmitted in a frequency range from 17 KHz to 25 KHz.

According to various embodiments of the disclosure, the first electronic device 500 may include at least one communication circuit (e.g., the communication circuit 560) configured to connect to a first network, the microphone 530, at least one speaker (e.g. the speaker 520), at least one processor (e.g., the processor 540) operationally connected to the communication circuit 560, the microphone 530, and the speaker 520, and the memory 550 operationally connected to the processor 540. The memory 550 may store instructions executable by the processor 540 for broadcasting first information associated with a wakeup utterance for calling a speech-based intelligent assistance service, the wakeup utterance being received through the microphone 530, receiving second information associated with the wakeup utterance broadcast by external electronic devices (e.g., the second electronic device 600, the third electronic device 700, and the fourth electronic device 720) connected to the first network, and determining whether to transmit speech information following the wakeup utterance to an external server (e.g., intelligent server 400) based on at least part of a comparison between the first information and the second information.

According to various embodiments of the disclosure, the instructions may include instructions executable by the processor 540 for broadcasting, at the first electronic device 500, an audio sound including the first information by using the speaker 520 and receiving an audio sound including the second information by using the microphone 530.

According to various embodiments of the disclosure, the instructions may include instructions executable by the processor 540 for broadcasting, at the first electronic device 500, the first information by using the communication circuit 560 and receiving the second information by using the communication circuit 560.

According to various embodiments of the disclosure, the instructions may include an instruction executable by the processor 540 for broadcasting, at the first electronic device 500, an audio sound including third information indicative of transmission of speech information following the wakeup utterance to the intelligent server 400 by using the speaker 520.

According to various embodiments of the disclosure, the instructions may include instructions executable by the processor 540 for receiving, at the first electronic device 500, an audio sound including fourth information associated with the wakeup utterance that is transmitted by an external electronic device (e.g., the user terminal 300) connected to a second network rather than the first network upon receipt of the third information and determining whether to transmit, at the first electronic device 500, speech information following the wakeup utterance to the intelligent server 400 based on at least part of a comparison between the first information and the fourth information.

According to various embodiments of the disclosure, the first to fourth information may include at least one of an SNR, wakeup utterance reception time information, priority information, and/or category information.

According to various embodiments of the disclosure, the user terminal 300 may include at least one communication circuit (e.g., the communication circuit 860) configured to connect to a first network, the microphone 830, at least one speaker (e.g., the speaker 820), at least one processor operationally connected to the communication circuit 860, the microphone 830, and the speaker 820, and a memory operationally connected to the processor 840. The memory 850 may store instructions executable by the processor 840 for generating first information associated with a wakeup utterance for calling a speech-based intelligent assistance service, the wakeup utterance being received through the microphone 830, receiving an audio sound including second information indicating that an external electronic device (e.g., the first electronic device 500, the second electronic device 600, or the third electronic device 700) connected to a second network rather than the first network is responsible for transmitting speech information following the wakeup utterance to the intelligent server 400, the audio sound being received by using the speaker, and transmitting the first information and the second information to the intelligent server 400.

According to various embodiments of the disclosure, the instructions may include an instruction executable by the processor 840 for determining, at the user terminal 300, whether to transmit speech information following the wakeup utterance to the intelligent server 400 based on at least part of a comparison between the first information and the second information.

According to various embodiments of the disclosure, the intelligent server 400 may include the communication circuit 1110 for receiving first information associated with a wakeup utterance for calling a speech-based intelligent assistance service, the first information being transmitted by a first external electronic device connected to a first network, and second information associated with the wakeup utterance, the second information being transmitted by a second external electronic device connected to a second network, at least one processor (e.g., the processor 1120), and the memory 1130 operationally connected to the processor. The memory 1130 may store instructions executable by the processor 1120 for detecting receipt of the first information, determining whether the first information include information indicating whether the second information is to be transmitted, determining whether other information is received in a predetermined period after receipt of the information, selecting an external electronic device (e.g., the user terminal 300 or the first electronic device 500) to which a processing result of the speech-based intelligent assistance service is to be transmitted based on at least part of a comparison between the first information and the second information, and transmitting the processing result to the selected external electronic device.

Figure 12:
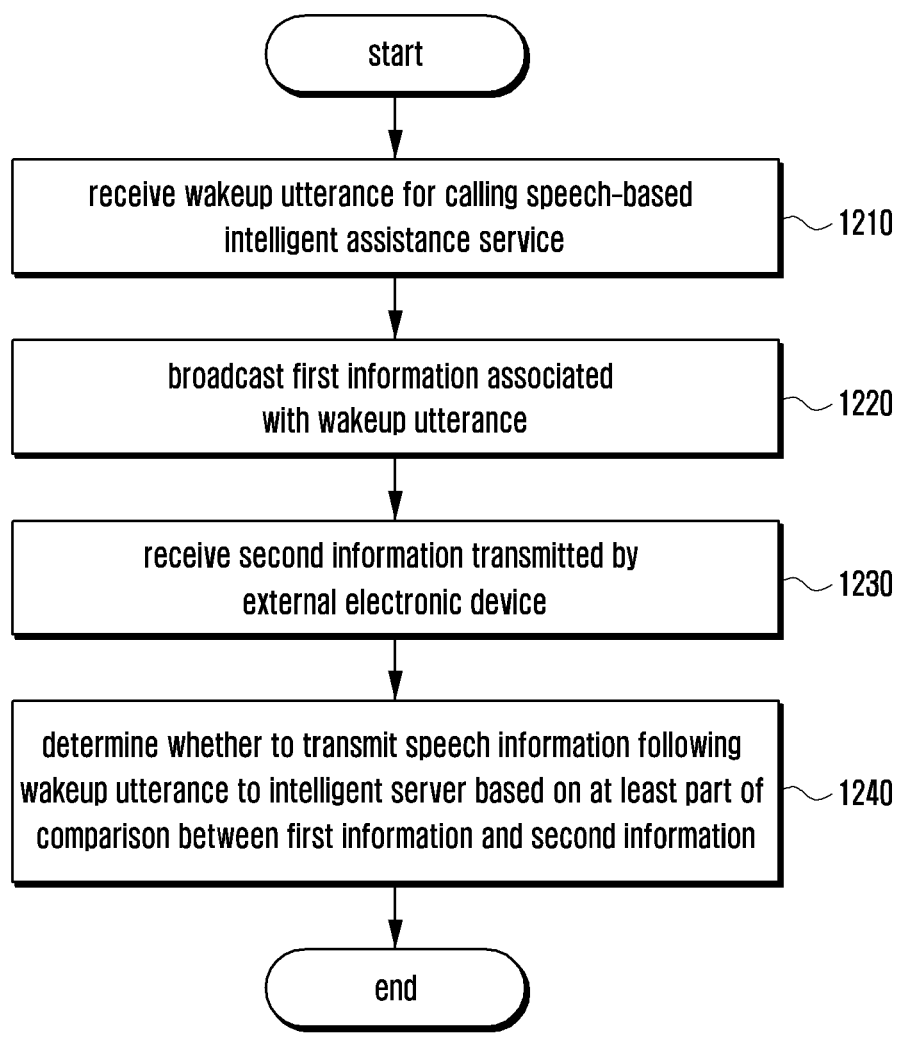
FIG. 12 is a flowchart illustrating an operation method of an electronic device according to an embodiment of the disclosure.

FIG. 12 is a flowchart illustrating an operation method of an electronic device according to an embodiment of the disclosure.

Referring to FIG. 12, a first electronic device (e.g., the first electronic device 500 in FIG. 3) may receive, at operation 1210, a wakeup utterance for calling a speech-based intelligent assistance service.

According to various embodiments of the disclosure, the first electronic device 500 may broadcast, at operation 1220, first information associated with the wakeup utterance.

According to various embodiments of the disclosure, the first information may include at least part of a wakeup utterance reception time at the first electronic device 500, an SNR of the wakeup utterance at the first electronic device 500, a quality of the wakeup utterance at the first electronic device 500, a priority of the first electronic device 500, and information on the first electronic device 500.

According to various embodiments of the disclosure, the first electronic device 500 may broadcast the first information in various manners. For example, the first electronic device 500 may broadcast the first information in such a way of outputting an audio sound including the first information by using the speaker 520. By way of another example, the first electronic device 500 may broadcast the first information for other electronic devices connected to a network (e.g., Wi-Fi network) to which the first electronic device is connected by using the communication circuit 560.

According to various embodiments of the disclosure, the audio sound may be a signal being transmitted in a frequency band difficult to be heard by a user and transmitted by means of the speaker 520. For example, the audio sound may be a signal being transmitted in a frequency range from 17 KHz to 25 KHz.

According to various embodiments of the disclosure, the first electronic device 500 may receive, at operation 1230, second information transmitted by an external electronic device (e.g., the second electronic device 600 in FIG. 3).

According to various embodiments of the disclosure, the first electronic device 500 may receive the first information broadcast by at least one electronic device (e.g., the second electronic device 600) close to the first electronic device 500. The second electronic device 600 may receive the wakeup utterance made by a user. The second electronic device 600 may broadcast the second information associated with the wakeup utterance upon receipt of the wakeup utterance. The first electronic device 500 may receive the second information broadcast by the second electronic device 600.

According to various embodiments of the disclosure, at operations 1220 and 1230 may be performed in reverse order or at the same time.

According to various embodiments of the disclosure, the first electronic device 500 may determine at operation 1240 whether to transmit speech information following the wakeup utterance to an intelligent server (e.g. the intelligent server 400 in FIG. 3) based on at least part of a comparison between the first information and the second information.

Figure 13:
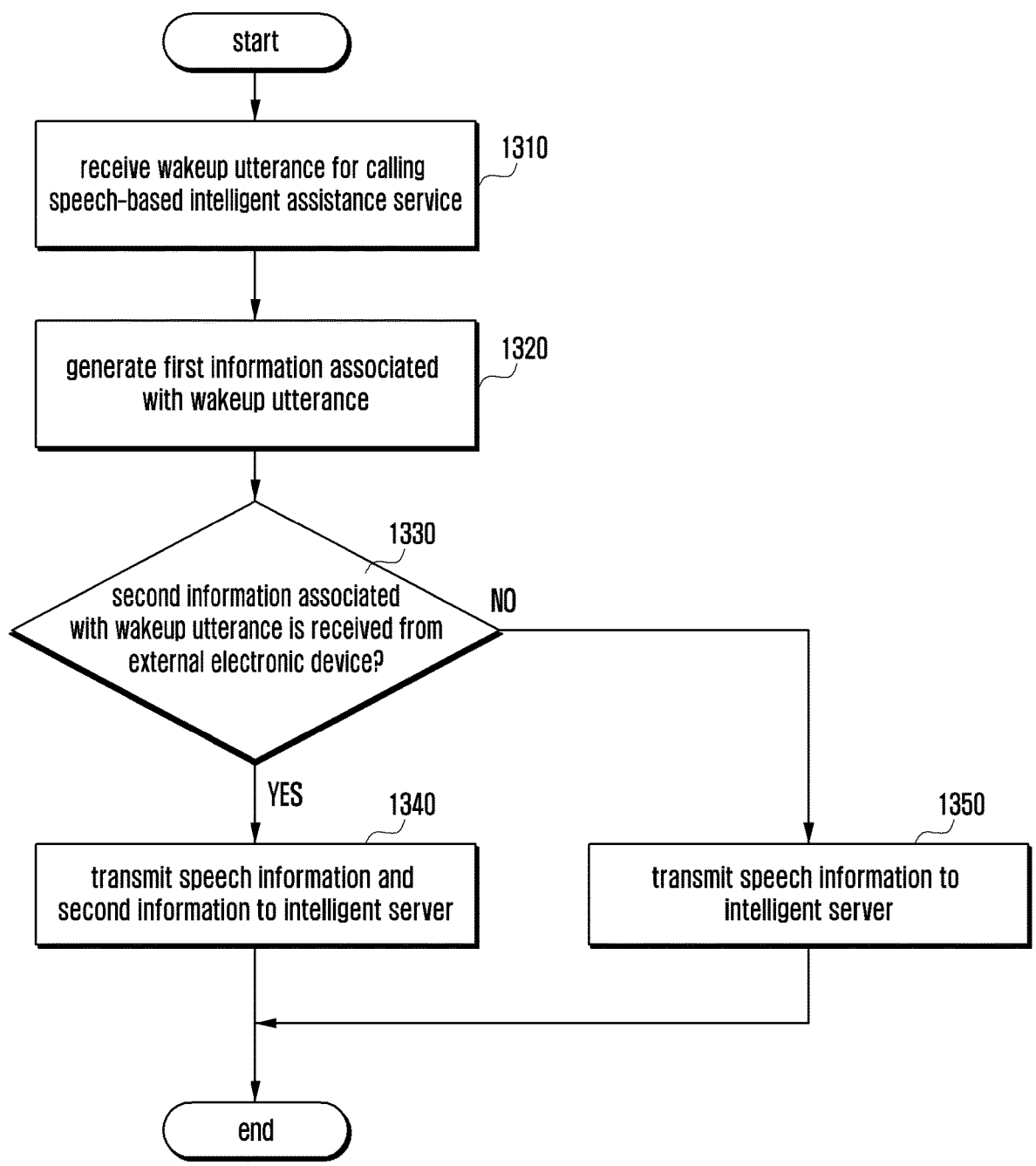
FIG. 13 is a flowchart illustrating an operation method of an electronic device according to an embodiment of the disclosure.

FIG. 13 is a flowchart illustrating an operation method of an electronic device according to an embodiment of the disclosure.

Referring to FIG. 13, a user terminal (e.g., the user terminal 300 in FIG. 3) may receive, at operation 1310, a wakeup utterance for calling a speech-based intelligent assistance service.

According to various embodiments of the disclosure, the user terminal 300 may generate, at operation 1320, first information associated with the wakeup utterance.

According to various embodiments of the disclosure, the first information may include at least part of a wakeup utterance reception time at the user terminal 300, an SNR of the wakeup utterance at the user terminal 300, a quality of the wakeup utterance at the user terminal 300, a priority of the user terminal 300, and information on the user terminal 300.

According to various embodiments of the disclosure, the user terminal 300 may determine, at operation 1330, whether second information associated with the wakeup utterance is received from an external electronic device (e.g., the first electronic device 500 in FIG. 3).

According to various embodiments of the disclosure, the first electronic device 500 may output an audio sound including second information indicative of transmission of user's speech information following the wakeup utterance. The user terminal 300 may receive the audio sound including the second information by using the microphone 830.

According to various embodiments of the disclosure, the user terminal 300 may transmit, at operation 1340, speech information and the second information to the intelligent server (e.g., the intelligent server 400 in FIG. 3) upon receipt of the second information associated with the wakeup utterance from the first electronic device 500.

According to various embodiments of the disclosure, the intelligent server 400 may determine whether data transmitted by the user terminal 300 includes the second information. The intelligent server 400 may wait for receiving user's speech information following the wakeup utterance from the first electronic device 500 based on a determination that the data includes the second information. The intelligent server 400 may select one of the user terminal 300 and the first electronic device 500 for transmitting a speech information processing result to the selected electronic device and transmit the speech information processing result to the selected electronic device.

According to various embodiments of the disclosure, the user terminal 300 may transmit, at operation 1350, the speech information to the intelligent server 400 based on a determination that the second information associated with the wakeup utterance is not received from the first electronic device. For example, if the second information associated with the wakeup utterance is not received from the first electronic device 500 during a predetermined time period, the user terminal 300 may transmit speech information to the intelligent server 400.

According to various embodiments of the disclosure, the intelligent server 400 may determine that the second information is not received, process the speech information, and transmit information produced as a processing result to the user terminal 300.

Figure 14:
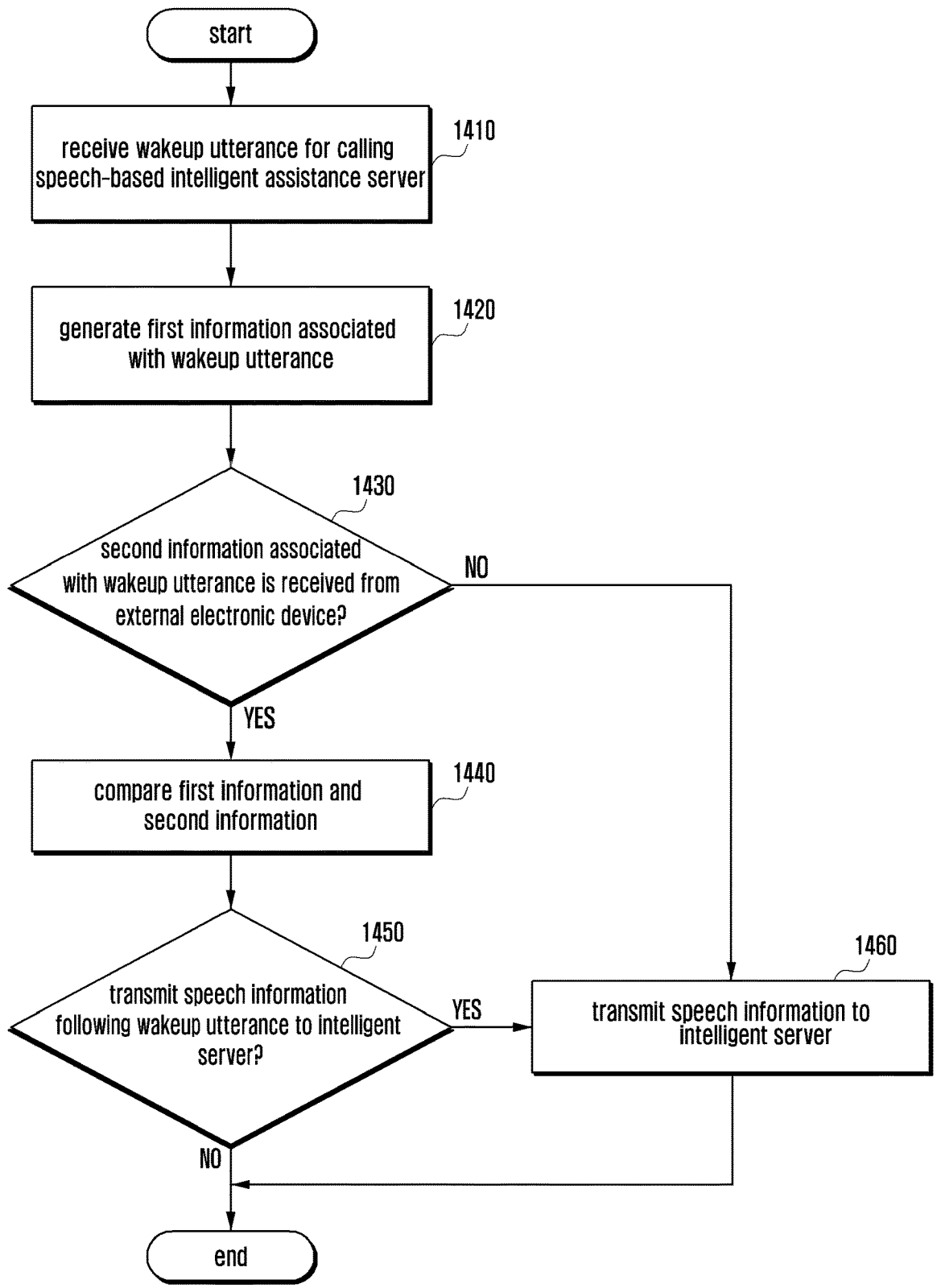
FIG. 14 is a flowchart illustrating an operation method of an electronic device according to an embodiment of the disclosure.

FIG. 14 is a flowchart illustrating an operation method of an electronic device according to an embodiment of the disclosure.

Referring to FIG. 14, a user terminal (e.g., the user terminal 300 in FIG. 3) may receive, at operation 1410, a wakeup utterance for calling a speech-based intelligent assistance service.

According to various embodiments of the disclosure, the user terminal 300 may generate, at operation 1420, first information associated with the wakeup utterance.

According to various embodiments of the disclosure, the first information may include at least part of a wakeup utterance reception time at the user terminal 300, an SNR of the wakeup utterance at the user terminal 300, a quality of the wakeup utterance at the user terminal 300, a priority of the user terminal 300, and information on the user terminal 300.

According to various embodiments of the disclosure, the user terminal 300 may broadcast an audio sound including the first information.

According to various embodiments of the disclosure, the user terminal 300 may determine, at operation 1430, whether second information associated with the wakeup utterance is received from an external electronic device (e.g., the first electronic device 500 in FIG. 3).

According to various embodiments of the disclosure, the first electronic device 500 may output an audio sound including second information. The second information may include at least part of information indicative of transmission of user's speech information following the wakeup utterance, a wakeup utterance reception time at the first electronic device 500, an SNR of the wakeup utterance at the first electronic device 500, a priority of the first electronic device 500, and device information of the first electronic device 500.

According to various embodiments of the disclosure, the user terminal 300 may transmit, at operation 1460, speech information following the wakeup utterance to the intelligent server 400 based on a determination that the second information is not received. According to various embodiments of the disclosure, the user terminal 300 may compare, at operation 1440, the first information and the second information based on a determination that the second information is received.

According to various embodiments of the disclosure, the user terminal 300 may determine, at operation 1450, whether to transmit speech information following the wakeup utterance to the intelligent server 400 based on a result of the comparison.

According to various embodiments of the disclosure, the first electronic device 500 may also compare the first information transmitted by the user terminal 300 and the second information to determine whether to transmit speech information following the wakeup utterance to the intelligent server 400 based on a result of the comparison.

According to various embodiments of the disclosure, the user terminal 300 may transmit, at operation 1460, speech information following the wakeup utterance to the intelligent server 400 based on a determination made at operation 1450 to transmit speech information following the wakeup utterance to the intelligent server 400. According to an alternative embodiment, the user terminal 300 may not transmit speech information to the intelligent server 400 based on a determination made at operation 1450 not to transmit speech information following the wakeup utterance to the intelligent server 400.

The above operation may obviate the need for the intelligent server 400 to select an electronic device to which a speech information processing result is transmitted, resulting in further reduction of load on the intelligent server.

According to various embodiments of the disclosure, an operation method of an electronic device may including receiving a wakeup utterance for calling a speech-based intelligent assistance service through the microphone 830 of the user terminal 300, broadcasting an audio sound including first information associated with the wakeup utterance through the speaker 820 of the user terminal 300, receiving an audio sound including second information transmitted by an external electronic device through the microphone 830, and determining whether to transmit speech information following the wakeup utterance to an external server (e.g., the intelligent server 400) based on at least part of a comparison between the first information and the second information.

According to various embodiments of the disclosure, the operation method of the electronic device may further include broadcasting third information associated with the wakeup utterance on a Wi-Fi network, receiving fourth information broadcast by at least one external electronic device (e.g., the user terminal 300) on the Wi-Fi network, and determining whether to transmit speech information following the wakeup utterance to the intelligent server 400 based on at least part of a comparison between the third information and the fourth information.

According to various embodiments of the disclosure, broadcasting the third information may be performed before the first information is broadcast.

According to various embodiments of the disclosure, the first to fourth information may include at least one of an SNR, wakeup utterance reception time information, priority information, and/or category information, and the audio sound is transmitted in a frequency range from 17 KHz to 25 KHz.

As described above, the electronic devices for determining a speech recognition execution device and operation method thereof according to various embodiments of the disclosure are advantageous in terms of reducing speech recognition load of an external server by exploiting one of electronic devices that recognize a user's speech as a speech recognition device.

The electronic devices for determining a speech recognition execution device and operation method thereof according to various embodiments of the disclosure are advantageous in terms of transmitting/receiving data to be used for selecting a speech recognition-enabled electronic device in the form of an audio sound. This makes it possible to transmit/receive data by means of a speaker and a microphone even in the case where the speech recognition-enabled electronic devices are connected to different networks in a certain space.

The electronic devices for determining a speech recognition execution device and operation method thereof according to various embodiments of the disclosure are advantageous in terms of improving speech recognition speed by reducing a speech recognition load of an external server.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1$^{st}$" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™, or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   at least one communication circuit configured to connect to a cellular network and a Wi-Fi network;
   a microphone;
   at least one speaker;
   a processor operatively coupled to the at least one communication circuit, the microphone, and the at least one speaker; and
   a memory operatively coupled to the processor and configured to store instructions executable by the processor to cause the processor to:
   transmit a first audio sound including first information associated with a wakeup utterance for calling a speech-based intelligence service through the speaker upon receipt of the wakeup utterance through the microphone,
   receive a second audio sound including second information through the microphone, and
   determine whether to control the electronic device to transmit speech information following the wakeup utterance to an external server based on at least part of a comparison between the first information and the second information.

2. The electronic device of claim 1, wherein the instructions executable by the processor further cause the processor to control the electronic device to transmit the speech information following the wakeup utterance to the external server based on not receiving the second information in a predetermined time period after transmitting the first information.

3. The electronic device of claim 1, wherein the instructions executable by the processor further cause the processor to:
   broadcast third information associated with the wakeup utterance on the Wi-Fi network by means of the communication circuit,
   receive fourth information broadcast by at least one external electronic device on the Wi-Fi network by means of the communication circuit, and
   determine whether to control the electronic device to transmit the speech information following the wakeup utterance to the external server based on at least part of a comparison between the third information and the fourth information.

4. The electronic device of claim 3, wherein the first to fourth information comprises at least one of a signal-to-noise ratio (SNR), wakeup utterance reception time information, priority information, or category information.

5. The electronic device of claim 3, wherein the instructions executable by the processor further cause the processor to broadcast the third information before transmitting the first information.

6. The electronic device of claim 3, wherein the instructions executable by the processor further cause the processor to control the electronic device to transmit the speech information following the wakeup utterance to the external server based on not receiving the fourth information in a predetermined time period after broadcasting the third information.

7. The electronic device of claim 1, wherein the first audio sound is transmitted in a frequency range from 17 KHz to 25 KHz.

8. The electronic device of claim 1,
   wherein the second audio sound including the second information is received from an external electronic device, and
   wherein the electronic device and the external electronic device are located close to one another in a same room to receive the wakeup utterance.

9. The electronic device of claim 1, wherein the determining of whether to control the electronic device to transmit the speech information is further based on a determination that a first quality of the wakeup utterance included in the first information is worse than a second quality of the wakeup utterance included in the second information.

10. The electronic device of claim 1, wherein the second audio sound is received in a frequency range from 17 KHz to 25 KHz.

11. The electronic device of claim 1, wherein the instructions executable by the processor further cause the processor to:
    receive an audio sound including fifth information indicating that an external device connected to a first network different from a second network connected to the electronic device is to transmit speech information following the wakeup utterance to an external server using the at least one speaker, and
    transmit the first information and the fifth information to the external server.

12. The electronic device of claim 11, wherein the instructions executable by the at least one processor further cause the at least one processor to determine whether to transmit speech information following the wakeup utterance to the external server based on at least part of a comparison between the first information and the fifth information.

13. An electronic device comprising:
    a communication circuit configured to:
    receive, from a first external electronic device connected to a first network, first information associated with a wakeup utterance for calling a speech-based intelligent assistance service, and
    receive, from a second external electronic device connected to a second network, second information associated with the wakeup utterance;
    a processor; and
    a memory operatively coupled to the processor and configured to store instructions executable by the processor to cause the processor to:
    detect receipt of the first information,
    check the first information for information indicating whether the second information is transmitted,
    determine whether other information is received in a predetermined time period after receipt of the first information and the second information,
    select one of the first and second external electronic devices to which a processing result of the speech-based intelligence assistance service is to be transmitted based on at least part of a comparison between the first information and the second information upon verifying receipt of the other information, and
    transmit the processing result to the selected one of the first and second external electronic devices.

14. An operational method of an electronic device, the method comprising:

receiving a wakeup utterance for calling a speech-based intelligent assistance service through a microphone of the electronic device;

broadcasting, through a speaker of the electronic device, a first audio sound including first information associated with the wakeup utterance;

receiving, through the microphone, a second audio sound including second information transmitted by an external electronic device; and determining whether to transmit speech information following the wakeup utterance to an external server based on at least part of a comparison between the first information and the second information.

15. The method of claim 14, further comprising:

broadcasting third information associated with the wakeup utterance on a Wi-Fi network;

receiving fourth information broadcast by at least one external electronic device on the Wi-Fi network; and determining whether to transmit the speech information following the wakeup utterance to the external electronic device based on at least part of a comparison between the first information and the fourth information.

16. The method of claim 15, wherein the broadcasting of the third information precedes the broadcasting of the first audio sound including the first information.

17. The method of claim 14, wherein the first to fourth information comprises at least one of a signal-to-noise ratio (SNR), wakeup utterance reception time information, priority information, or category information.

18. The electronic device of claim 1, wherein the second audio sound including the second information is received from an external electronic device, and wherein the electronic device and the external electronic device are located close to one another in a same room to receive the wakeup utterance.

19. The electronic device of claim 1, wherein the determining of whether to control the electronic device to transmit the speech information is further based on a determination that a first quality of the wakeup utterance included in the first information is worse than a second quality of the wakeup utterance included in the second information.

20. The electronic device of claim 1, wherein the second audio sound is received in a frequency range from 17 KHz to 25 KHz.

* * * * *